(12) United States Patent
Cai et al.

(10) Patent No.: US 9,767,211 B2
(45) Date of Patent: Sep. 19, 2017

(54) METHOD AND SYSTEM OF EXTRACTING WEB PAGE INFORMATION

(71) Applicant: Alibaba Group Holding Limited, Grand Cayman (KY)

(72) Inventors: Boyang Cai, Hangzhou (CN); Qi Qiang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 317 days.

(21) Appl. No.: 14/697,696

(22) Filed: Apr. 28, 2015

(65) Prior Publication Data

US 2015/0242527 A1 Aug. 27, 2015

Related U.S. Application Data

(63) Continuation of application No. 13/522,463, filed as application No. PCT/US2012/042284 on Jun. 13, 2012, now Pat. No. 9,053,206.

(30) Foreign Application Priority Data

Jun. 15, 2011 (CN) .......................... 2011 1 0161113

(51) Int. Cl.
*G06F 17/00* (2006.01)
*G06F 17/30* (2006.01)
(Continued)

(52) U.S. Cl.
CPC ...... *G06F 17/30893* (2013.01); *G06F 17/211* (2013.01); *G06F 17/2247* (2013.01); *G06F 17/30908* (2013.01)

(58) Field of Classification Search
CPC .................................................. G06F 17/211
See application file for complete search history.

(56) References Cited

U.S. PATENT DOCUMENTS 6,654,734 B1 * 11/2003 Mani ................. G06F 17/30861
7,107,282 B1 * 9/2006 Yalamanchi ........ G06F 17/2241
707/754
(Continued)

FOREIGN PATENT DOCUMENTS

| CN | 101944094 A | 1/2011 |
|----|-------------|--------|
| JP | 2005301437 | 10/2005 |
| JP | 2010086517 | 4/2010 |

OTHER PUBLICATIONS

Translated Chinese Office Action mailed Sep. 3, 2014, for Chinese Patent Application No. 201110161113.6, foreign priority application of U.S. Appl. No. 13/522,463, 18 pgs.

(Continued)

*Primary Examiner* — Laurie Ries
(74) *Attorney, Agent, or Firm* — Lee & Hayes, PLLC

(57) ABSTRACT

A method of extracting web page information includes analyzing a document object model (DOM) structure of a sample page to obtain a position of information to be extracted. A node corresponding to the position of the information to be extracted is rendered in the DOM structure as a target node. Starting from the target node, relative position information is traversed recursively until the root node is found to create candidate paths. The candidate paths are rendered as a path set. A DOM structure of a page to be extracted is analyzed, information is located in the DOM structure of the page starting from the root node in the path set, and an extracted node candidate set is obtained. A node having highest robustness from the extracted node candidate set is selected to be a final extracted node and extracted information is obtained using the extracted node.

20 Claims, 11 Drawing Sheets

(51) Int. Cl.
  *G06F 17/21* (2006.01)
  *G06F 17/22* (2006.01)

(56) References Cited

U.S. PATENT DOCUMENTS

| | | | | |
|---|---|---|---|---|
| 7,725,817 | B2* | 5/2010 | Krasun | G06F 17/30911 |
| | | | | 715/236 |
| 8,196,036 | B2* | 6/2012 | Huang | G06F 17/211 |
| | | | | 715/239 |
| 8,196,037 | B2* | 6/2012 | Cheng | G06F 17/2247 |
| | | | | 715/241 |
| 8,589,366 | B1* | 11/2013 | Younes | G06F 17/30864 |
| | | | | 707/602 |
| 8,667,015 | B2* | 3/2014 | Jiao | G06F 17/30896 |
| | | | | 706/11 |
| 2003/0200502 | A1 | 10/2003 | Abe et al. | |
| 2004/0205577 | A1* | 10/2004 | Abe | G06F 17/2241 |
| | | | | 715/230 |
| 2006/0218194 | A1* | 9/2006 | Yalamanchi | G06F 17/2241 |
| 2007/0206221 | A1* | 9/2007 | Wyler | H04L 67/42 |
| | | | | 358/1.15 |
| 2008/0065737 | A1* | 3/2008 | Burke | G06F 17/30058 |
| | | | | 709/217 |
| 2008/0294679 | A1* | 11/2008 | Gatterbauer | G06F 17/30861 |
| 2008/0320031 | A1* | 12/2008 | Denoual | G06F 17/2247 |
| 2009/0044098 | A1* | 2/2009 | Wyler | H04L 67/42 |
| | | | | 715/234 |
| 2009/0063500 | A1* | 3/2009 | Zhai | G06F 17/30911 |
| 2009/0125529 | A1* | 5/2009 | Vydiswaran | G06F 17/30864 |
| 2009/0204889 | A1* | 8/2009 | Mehta | G06F 17/30 |
| | | | | 715/246 |
| 2009/0216758 | A1* | 8/2009 | Tuttle | G06F 17/30864 |
| 2009/0248707 | A1* | 10/2009 | Mehta | G06F 17/212 |
| 2010/0083095 | A1* | 4/2010 | Nikovski | G06F 17/30896 |
| | | | | 715/234 |
| 2010/0169311 | A1* | 7/2010 | Tengli | G06F 17/30864 |
| | | | | 707/736 |
| 2011/0040770 | A1* | 2/2011 | Madaan | G06F 17/30861 |
| | | | | 707/754 |
| 2011/0258528 | A1* | 10/2011 | Roper | G06F 17/30905 |
| | | | | 715/234 |
| 2012/0059859 | A1* | 3/2012 | Jiao | G06F 17/30896 |
| | | | | 707/797 |
| 2012/0072409 | A1* | 3/2012 | Perry | G06Q 30/0603 |
| | | | | 707/710 |
| 2012/0089903 | A1* | 4/2012 | Liu | G06F 17/30905 |
| | | | | 715/234 |
| 2013/0339498 | A1* | 12/2013 | Johnson | H04W 4/02 |
| | | | | 709/221 |
| 2014/0026034 | A1* | 1/2014 | Harrison | G06F 17/30899 |
| | | | | 715/234 |

OTHER PUBLICATIONS

Extended European Search Report mailed Mar. 19, 2015 for European Patent Application No. 12800504.8, 10 pages.
PCT Search Report mailed Aug. 13, 2012 for PCT application No. PCT/US12/42284, 9 pages.

* cited by examiner

METHOD AND SYSTEM OF EXTRACTING WEB PAGE INFORMATION

CROSS REFERENCE TO RELATED PATENT APPLICATIONS

This application is a continuation of and claims priority to U.S. patent application Ser. No. 13/522,463, filed Jul. 16, 2012, titled "Method and System of Extracting Web Page Information," which is a national stage application of an international patent application PCT/US12/42284, filed Jun. 13, 2012, which claims priority to Chinese Patent Application No. 201110161113.6, filed on Jun. 15, 2011, titled "Method and system of extracting web page information," which applications are hereby incorporated by reference in their entirety.

TECHNICAL FIELD

The present disclosure relates to the field of network technology and in particular relates to methods and systems of extracting web page information.

BACKGROUND

With the rapid development of the Internet, the Internet has become the most important platform for information distribution. However, in view of the explosive growth of information on the Internet, how to quickly and efficiently obtain information desired by users has become a problem that needs to be addressed. Conventional search engines can help people to obtain web pages through keyword search. However, they can only provide links of relevant pages. The users still need to manually browse the web pages to find information desired thereby. On the other hand, because it is impossible to customize accurate queries, a number of search results are not what the users desire, and therefore accurate and specialized search results cannot be provided. An ideal method is: to query the Internet as if it were a source of information such as a database. Web page information extraction has therefore emerged. Web page information extraction can obtain web page information of interest from different information sources, and extract and store information that is of interest to users in a database so that the users can perform information queries, searches, data mining or data analysis using the information in the database. An objective of the web page information extraction is to extract textual information of a web page and express the textual information as structured data. An objective of so doing is to convert text information that is hard to process into structured data that is easily processed and analyzed.

A web page is a document defined by Document Object Model (DOM) and Hyper Text Mark-up Language (HTML), and is a semi-structuralized document, in which valuable information is commonly stored in a backend database and presented to a user using a fixed page template. A web page is actually a file. What is presented to the users is normally content that has been interpreted by a browser. If we select "view source" from a menu, we can view actual content of the web page using a notepad. As can be seen, a web page is actually a text file that describes elements such as text, images, tables and sound, etc., on a web page using a variety of tags (e.g. headers, font, color, size, etc.). These tags separate the text content that is to be displayed in the web page. The tags introduce structured information to the document. Based on these tags, a document can be represented as a tree structure, which is referred to as a DOM structure. By locating a position of content to be extracted in the DOM structure, extraction of web page information can be realized. A common process of extracting web page information includes: obtaining position information of content to be extracted from a sample page, and for a dataset of web pages using a same template, implementing content extraction using the position information. The accuracy of the position information directly determines the quality of the web page information extraction. Due to a rapid rate of update of web pages, the DOM structure is complicated and changed frequently, thus easily leading to modifications in the position information and resulting in positioning failure or extraction of incorrect information. A web page information extraction system seeks to find a solution for an accurate and robust ("robust" has a meaning of "strong", "sturdy' or "steady", etc.) positioning of web page content.

In existing technologies, there exists a method of automatically generating XPATH (XPATH is a language for finding information in a XML document, and XPATH selects nodes or node sets in the XML document using path expressions) to perform extraction of web page information. The method of automatically generating XPATH includes: selecting content for extraction from a web page by a user, recording a position of the extracted content in a DOM structure by a process, automatically generating an XPATH path that includes only tag name information and shift information from a DOM root node level-by-level down to a target node, and obtaining information from a set of web pages to be extracted using the XPATH. The automatically generated XPATH generally records only information of tag names and shifts, and oversimplifies positioning information, thus failing to follow the ever-changing web page structure. Moreover, after content of a web page is updated, problems such as failing to locate the content or locating content not intended for extraction, etc., arise after elements on the XPATH path are changed. At the same time, because the recorded information of XPATH is oversimplified, XPATH cannot be used to solve the identification problem of repeated structures. Additional computations for implementing identification and extraction of the repeated structures are thus required.

When implementing the present disclosure, inventors have discovered at least the following problems that exist in existing technologies: web page information extraction generally uses a semi-automatic information extraction method, and locates information to be extracted by analyzing a page structure. Since web page information is a type of data that changes dynamically and is updated in real time, position information becomes invalid after the content of a web page is updated and the structure of the web page is changed, leading to extraction failures or inaccurate extraction results.

On the other hand, existing technologies cannot competently solve the problem of identification of repeated structures. The automatic XPATH generation method cannot use the XPATH to solve the problem of identification of repeated structures, and requires additional computations for implementing identification and extraction of repeated structures.

SUMMARY

In order to solve the aforementioned problems, embodiments of the present disclosure provide a method and a system of extracting web page information that can accurately locate information and obtain an accurate extraction result with good robustness even after content of a web page is updated and structure of the web page is changed.

A technical proposal is as follows:

An embodiment of the present disclosure provides a method of extracting web page information. The method includes:

analyzing a DOM structure of a sample page to obtain a position of information to be extracted in the DOM structure;

rendering a node corresponding to the position of the information to be extracted in the DOM structure as a target node, starting from the target node, traversing relative position information that has been obtained in advance to obtain a node and determine whether the node is a root node, if not, continuing recursively to find another node until the root node is found to create candidate paths, and rendering the candidate paths obtained from the target node to the root node as a path set;

analyzing a DOM structure of a page to be extracted, locating the information to be extracted in the DOM structure of the page to be extracted using a path starting from the root node in the path set, and obtaining a node corresponding to the position of the information to be extracted in the DOM structure of the web page to be extracted as an extracted node candidate set; and selecting a node having the highest robustness from the extracted node candidate set to be a final extracted node and obtaining extracted information using the extracted node.

Preferably, starting from the target node, traversing relative position information that has been obtained in advance to obtain a node and determine whether the node is a root node, if not, continuing recursively to find another node until the root node is found to create candidate paths, and rendering the candidate paths obtained from the target node to the root node as a path set, specifically include:

starting from the target node, rendering the target node as a current node;

traversing relative position information of nearest neighbors of the current node that has been obtained in advance, from which selecting a Bi node corresponding to a relative position i, and determining whether Bi is the root node;

if Bi is determined to be the root node, adding a path thereof to a path list; if not, using Bi as the current node and recursively finding another node until the root node is found and adding a path thereof to the path list; and rendering paths in the path list as the path set.

Preferably, selecting a node having the highest robustness from the extracted node candidate set to be a final extracted node includes:

according to rules of reliability determination, computing scores associated with paths corresponding to candidate extracted nodes in the extracted node candidate set, and selecting a node corresponding to a path having the highest score as the final extracted node.

Preferably, starting from the target node, traversing relative position information that has been obtained in advance to obtain a node and determine whether the node is a root node, if not, continuing recursively to find another node until the root node is found to create candidate paths, and rendering the candidate paths obtained from the target node to the root node as a path set, specifically include:

starting from the target node, rendering the target node as a current node;

traversing relative position information of nearest neighbors of the current node that has been obtained in advance, from which selecting a Bi node corresponding to a relative position i, and determining whether Bi is the root node;

if Bi is determined to be the root node, adding a path thereof to a path list;

if Bi is determined not to be the root node, computing and determining a condition of score deduction according to the rules of reliability determination, if the score deduction is not greater than a set threshold, using the Bi node as the current node, continuing recursively to find another node until the root node is found and adding a path thereof to the path list; if the score deduction is greater than the threshold, stopping to perform a search on a current path; and storing first N paths having the least score deductions in the path list as the path set.

Preferably, starting from the target node, traversing relative position information that has been obtained in advance to obtain a node and determine whether the node is a root node, if not, continuing recursively to find another node until the root node is found to create candidate paths, and rendering the candidate paths obtained from the target node to the root node as a path set, specifically include:

starting from the target node, rendering the target node as a current node;

traversing relative position information of nearest neighbors of the current node that has been obtained in advance, from which selecting a Bi node corresponding to a relative position i, and determining whether Bi is the root node;

if Bi is determined to be the root node, adding a path thereof to a path list; if not, using Bi as the current node and recursively finding another node until the root node is found and adding a path thereof to the path list;

according to the rules of reliability determination, performing score deductions for all paths found in the path list, determining whether a total score deduction of a path is greater than the threshold, and if not greater than the threshold, retaining a result associated with the path; and storing first N paths having the least score deductions in the path list as the path set.

Preferably, the first N paths having the least score deductions in the path list are stored as the path set, where N is a predetermined integer.

Preferably, selecting a node having the highest robustness from the candidate extracted node set to be a final extracted node includes:

selecting a node corresponding to a path having the highest score as the final extracted node from the extracted node candidate set.

Preferably, the rules of reliability determination include rules associated with relative position information, rules associated with total number of nodes, and/or rules associated with shift position information.

Preferably, obtaining the relative position information corresponding to the nodes in advance includes:

traversing the DOM structure to obtain text and style information of the nodes; and obtaining relative position information of nearest neighbors for each node using the text and style information.

Preferably, upon rendering the candidate paths obtained from the target node to the root node as the path set, the method further includes:

computing path similarities between the nodes using path information of the nodes in the obtained path set and identifying a path having a repeated structure.

Preferably, computing path similarities between the nodes using path information of the nodes in the obtained path set and identifying a path having a repeated structure, includes:

computing the path similarities between sibling nodes using the path information of the nodes;

obtaining all sibling nodes having the repeated structure using the path similarities and recording shift information of sibling nodes having the repeated structure;

filtering out equivalent paths owned by all the sibling nodes having the repeated structure as the path set used during extraction.

Preferably, obtaining the extracted node set of the web page to be extracted using the path set includes:

obtaining the extracted node candidate set for the web page to be extracted using the path set, if a path points to a repeated structure, extracting multiple paths that have the repeated structure using the shift information of the sibling nodes that have the repeated structure, and obtaining the nodes corresponding to the web page information to be extracted as the extracted node candidate set.

Preferably, computing the path similarities between sibling nodes using the path information of the nodes includes:

$$sim(A, B) = \frac{\sum_{x}^{path(A \cap B)} score(x)}{\sum_{x}^{path(A \cup B)} score(x)}$$

where sim(A, B) represents a degree of similarity between nodes A and B;

path(A∩B) represents a set of equivalent paths associated with the nodes A and B;

path(A∪B) represents a set including all the paths associated with the nodes A and B; and score(x) represents a score deduction of a path x.

Preferably, the method further includes:

comparing a weight of the path corresponding to the final extracted node relative to the path set against a set threshold to determine whether associated extraction is successful, if a result obtained thereof is greater than the set threshold, determining that the extraction is failed; if the obtained result is less than or equal to the set threshold, determining that the extraction is successful.

The embodiments of the present disclosure further disclose a system of extracting web page information, the system including:

a sample page to-be-extracted information position acquisition unit used for analyzing a DOM structure of a sample page and obtaining position of information to be extracted in the DOM structure;

a path set acquisition unit used for rendering a node corresponding to the position of the information to be extracted in the DOM structure as a target node, starting from the target node, traversing relative position information that has been obtained in advance to obtain a node and determine whether the node is a root node, if not, continuing recursively to find another node until the root node is found to create candidate paths, and rendering the candidate paths obtained from the target node to the root node as a path set;

an extracted node candidate set acquisition unit used for analyzing a DOM structure of a page to be extracted, locating the information to be extracted in the DOM structure of the page to be extracted using a path starting from the root node in the path set, and obtaining a node corresponding to the position of the information to be extracted in the DOM structure of the page to be extracted as an extracted node candidate set; and an extracted information acquisition unit used for selecting a node having the highest robustness from the extracted node candidate set to be a final extracted node and obtaining extracted information using the extracted node.

Preferably, the system further includes:

a node position information acquisition sub-unit used for traversing the DOM structure to obtain text and style information of nodes, and obtaining relative position information of nearest neighbors for each node using the text and style information.

Preferably, the system further includes:

a repeated structure recognition unit used for computing path similarities between the nodes using path information of the nodes in the obtained path set and identifying a path having a repeated structure.

Preferably, the repeated structure recognition unit includes:

a path similarity computation sub-unit used for computing the path similarities between sibling nodes using the path information of the nodes;

a repeated sibling node acquisition sub-unit obtaining all sibling nodes having the repeated structure using the path similarities;

a shift information recording sub-unit used for recording shift information of sibling nodes having the repeated structure; and an equivalent path acquisition sub-unit used for filtering out equivalent paths owned by all the sibling nodes having the repeated structure as the path set used during extraction.

Preferably, the system further includes:

an extraction result determination unit that compares a weight of the path corresponding to the final extracted node relative to the path set against a set threshold to determine whether associated extraction is successful.

By using multi-path positioning technology and analyzing DOM structure and text content, the present disclosure automatically discovers patterns, generates a large number of weighted and not strictly ordered paths, extracts content by locating multiple paths, and selects a final extraction result based on associated weights of the paths. As the large number of paths include abundant page information, the problems of extraction failures or inaccurate extraction results due to invalid position information after content of a web page is updated and structure of the web page structure is changed are solved while preserving data accuracy without increasing interaction cost.

On the other hand, based on the abundant information associated with the multiple paths, determination of a repeated structure can be achieved by computing overall degrees of similarity of the paths, thus competently solving the problem of identifying and extracting repeated structures.

BRIEF DESCRIPTION OF THE DRAWINGS

In order to more clearly understand the technical scheme of the exemplary embodiments of the present disclosure or existing technologies, accompanying figures that are essential for explaining the exemplary embodiments or existing technologies are briefly described below. The following figures only constitute a few exemplary embodiments of the present disclosure. Based on these accompanying figures, one skilled in the art can obtain other figures without making any creative effort.

DETAILED DESCRIPTION

Figure 1:
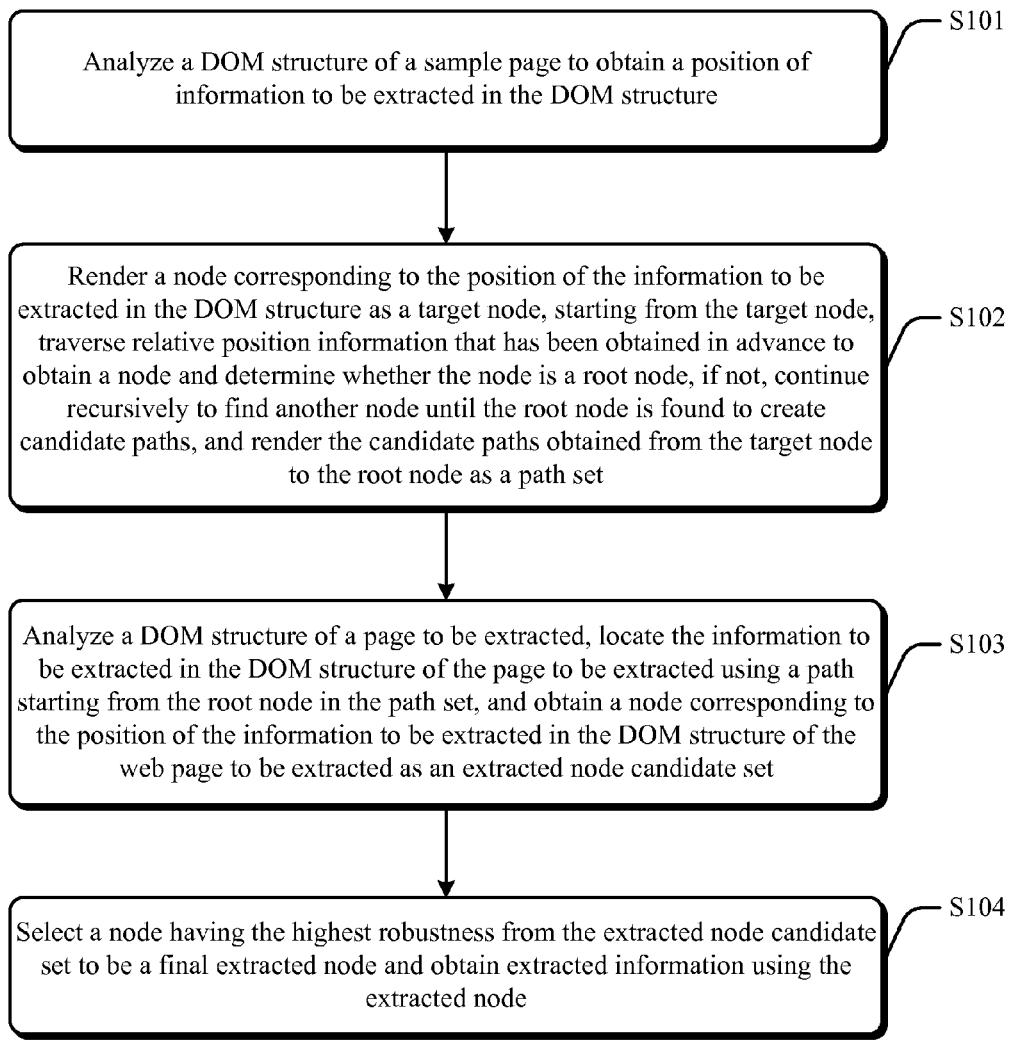
FIG. 1 is a flowchart illustrating an example method of the present disclosure.

The present disclosure discloses a method of extracting web page information. In order for one skilled in the art to understand the technical scheme in the present disclosure, the technical scheme in the exemplary embodiments will be described more clearly and completely using the accompanying figures of the exemplary embodiments. The exemplary embodiments described herein only constitute parts, but not all, of exemplary embodiments of the present disclosure. Based on the exemplary embodiments of the present disclosure, one skilled in the art can obtain all other exemplary embodiments, which are still within the scope of the present disclosure.

A web page is a semi-structured document whose valuable information is normally stored in a backend database and presented to users in a fixed page template. A common process of extracting web page information includes: obtaining position information of content to be extracted from a sample page, and for a dataset of web pages using a same template thereof, implementing content extraction using the position information. The accuracy of the position information directly determines the quality of the web page information extraction. In existing technologies, there exists a method of automatically generating XPATH (XPATH is a language for finding information in a XML document, and XPATH selects nodes or node sets in the XML document using path expressions) to perform extraction of web page information. The method of automatically generating XPATH includes: selecting content for extraction from a web page by a user, recording a position of the extracted content in a DOM structure by a process, automatically generating an XPATH path that includes only tag name information and shift information from a DOM root node level-by-level down to a target node, and obtaining information from a set of web pages to be extracted using the XPATH. The automatically generated XPATH generally records only information of tag names and shifts, and oversimplifies positioning information, thus failing to follow the ever-changing web page structure. Moreover, after content of a web page is updated, problems such as failing to locate the content or locating content not intended for extraction, etc., arise after elements on the XPATH path are changed. At the same time, because the recorded information of XPATH is oversimplified, XPATH cannot be used to solve the identification problem of repeated structures, requiring additional computations for implementing identification and extraction of the repeated structures.

In view of the above, the present disclosure provides a method of extracting web page information. In the technical proposal provided by the present disclosure, when a path set of a sample page is obtained, a reverse positioning method is used to obtain multiple paths from a target node to a root node. A multiple path positioning method is then used to locate information of a page to be extracted based on the path set formed by the multiple paths. Therefore, as multiple paths are obtained to locate information of the page to be extracted, content to be extracted can be accurately located with good robustness even if the page information has been modified and the structure has been changed, provided that the page has not been restructured substantially.

FIG. 1 is a flowchart of a method in accordance with an embodiment of the present disclosure. The method of extracting web page information of the present disclosure is described hereinafter in combination with the accompanying figure.

A method of extracting web page information includes the following procedure.

S101 analyzes a DOM structure of a sample page, and obtains a position of information to be extracted in the DOM structure.

S102 renders a node corresponding to the position of the information to be extracted in the DOM structure as a target node, starting from the target node, traverses relative position information that has been obtained in advance to obtain a node and determine whether the node is a root node, if not, continues recursively to find another node until the root node is found to create candidate paths, and renders the candidate paths obtained from the target node to the root node as a path set.

S103 analyzes a DOM structure of a page to be extracted, locates the information to be extracted in the DOM structure of the page to be extracted using a path starting from the root node in the path set, and obtains a node corresponding to the position of the information to be extracted in the DOM structure of the page to be extracted as an extracted node candidate set.

S104 selects a node having the highest robustness from the extracted node candidate set to be a final extracted node and obtains extracted information using the extracted node.

First Embodiment

In the technical proposal provided by the present disclosure, we first need to obtain position information of information to be extracted in a sample page, i.e., position information of a target node, and obtain multiple paths from the target node to a root node using the position information of the target node, where a reverse positioning method is used. The sample page is normally provided by a user and is a web page using a same web page template of a web page to be extracted. A possible implementation of the method is to have the user enter a web address based on information desired to be extracted, and download an associated web page as the sample page. Sample pages may be downloaded from different websites. Accordingly, web pages to be extracted in this case correspond to a set of web pages having the same template as the sample page. Other methods may be used to obtain samples pages, and are not limited by the present disclosure.

In existing technologies, a user selects information in a sample page for extraction, a process records position of the information for extraction in the DOM structure, and a backend automatically generates a path from a root node down to a target node level by level. When a change occurs to any node thereof, a problem of failing to locate content may arise. The technical proposal provided by the present disclosure uses relative position information of nearest neighbors to obtain multiple paths and uses the multiple paths that begin at the root node of a page to be extracted to find a target node, i.e., content to be extracted.

Figure 2:
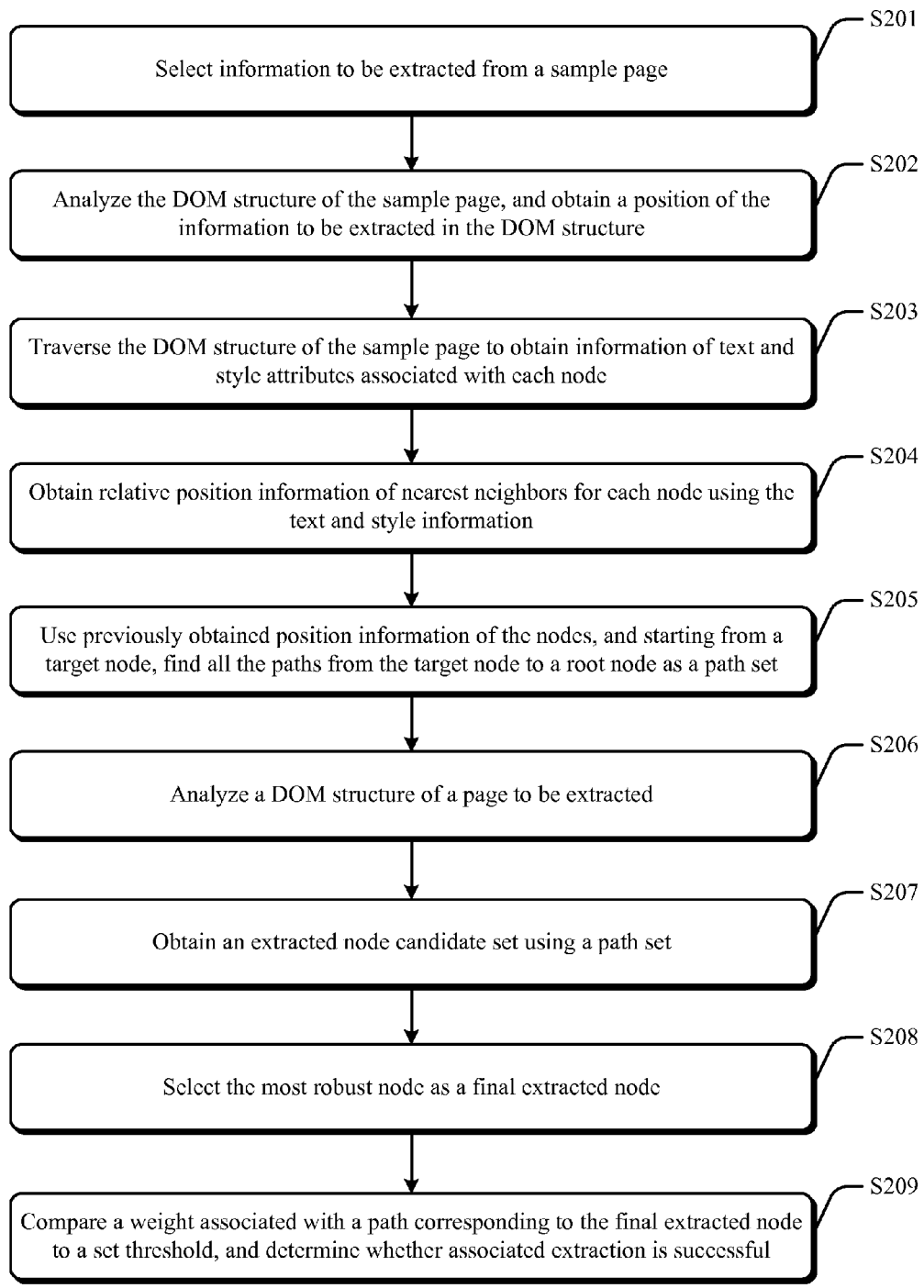
FIG. 2 is a flowchart illustrating a method in accordance with the first embodiment of the present disclosure.

With reference to FIG. 2, FIG. 2 is a flowchart illustrating a method in accordance with the first embodiment of the present disclosure, and is described hereinafter in combination with the figure.

S201 selects information to be extracted from a sample page.

The information to be extracted is information that is of interest to a user, and with respect to web page information extraction, corresponds to the type of information that the user desires to extract through the web page information extraction. The information to be extracted is generally defined or provided by the user. In the embodiment provided by the present disclosure, the user can select the information to be extracted from the sample page through an interactive interface. At this time, the user can indicate the information to be extracted in the sample page using line selection or frame selection. If the information to be extracted in the sample page indicated by the user is "history and source", the user can select the information to be extracted using line or frame selection.

S202 analyzes the DOM structure of the sample page, builds up a DOM tree, obtains a position of the information to be extracted in the DOM structure, and obtains position information of a target node.

DOM (Document Object Model) has a Chinese name called 文档对象模型. . DOM is designed based on the specification of an object management group (OMG), and describes a document model in an object-oriented manner. DOM defines objects that are needed for representing and modifying a document, behaviors and attributes of these objects, and relationships among these objects. DOM maps an entire web page onto a document formed by layers of nodes. All DOM structure has only one root node, and is a tree structure with each HTML tag representing a node on the tree.

Table 1 shows a simple example of a DOM structure.

TABLE 1

```
<html>
<head>
<body id="view">
<div id="usrbar">
<div id="wrap">
<div id="header">
<div id="page">
<div id="content-wrap"class="layout grid-m0s245 w1000">
<div id="content"class="col-main article">
<div class="main-wrap main-shadow">
<div class="content-hd">
<div class="content-bd main-body">
<div class="text">
<span class="editable-lemma"data-edit-id="page94238"></span>
<h1 class="title">regular expression<h1>
<script>
<script type="text/javascript">
<div class="clear"> </div>
<style type="text/css">
<div class="mod-top">
<fieldset id="catalog-0"class="text_dir nslog-area">
<div class="clear"></div>
<script type="test/javascript">
<div id="lemmacontent-0 "class="lemma-main-content">
```

TABLE 1-continued

```
<h2 class="headline-1 first bk-sidecatalog-title">
<span class="text_edit editable-title"data-edit>
<a class="nslog:1019" onclich="bk.view.edit.Le">
< /span/>
<a name="1"></a>
<span class="headline-content">history and source</span>
</h2>
```

Position of the information to be extracted, "history and source", in the DOM document is:
    <span class="headline-content">history and source</span>

In this way, the position information of the information to be extracted in the DOM, i.e., position information of the target node, is obtained.

S203 traverses the DOM structure of the sample page to obtain information of text and style attributes associated with each node. Text and style information of the nodes is obtained primarily for preparation for defining relative position information of the nodes. In the technical proposal provided by the present disclosure, all paths from the target node to the root node are obtained by using relative position information. Based on the relative position information, multiple paths from the target node to root node are found.

We introduce information of a node as follows. Information of a node mainly includes:
  (1) HTML tag name
In <span class="headline-content">history and source</span>, associated tag name is "span".
  (2) Text content
For example: <span> price: </span>
<strong id="J-StrPrice">719.0</strong>
where "price" is text information of the node.
  (3) Tag style ID (Identifier)
For example: <span> price: </span>
<strong id="J-StrPrice">719.0</strong>
An id of a tag "strong" for a recorded price=J_StrPrice.
  (4) Tag style class (category)
<span class="headline-content">history and source</span>
A class for a tag "span" is: class=headline-content.
  (5) Other style attributes mainly include: name, src, href, alt, etc.

S204 obtains relative position information of nearest neighbors for each node using the text and style information.

In the embodiments provided by the present disclosure, relative position information of nearest neighbors may be defined into two main classes.

One class corresponds to information of a node having a sibling, parent or child relationship with the target node, where nodes that directly connect to a same parent node are called sibling nodes.

As an example for illustration, A is a target node, and B is a node adjacent to A. Based on a node layer relationship between node B and node A, node B that has the following relationship with node A can be defined as a nearest neighbor: B is a left sibling of A, B is a right sibling of A, B is a parent of A, B is a child of A. Correspondingly, position information of node B can be referred to as relative position information of a nearest neighbor.

Another class refers to a node having a direct layer relationship with the target node and possessing text and style attributes. The direct layer relationship is defined herein as B to be a parent, a child or descendent of A. Use an example for illustration. A is a target node. B is a descendent node of A, and is a node having style ID as XXX.

Here, position information of node B can be referred to as relative position information of a nearest neighbor. Similarly, B being a descendent node of A and a node having style class as XXX, B being a descendent node of A and a node having text as XXX, and B being a child node of A and a node having a tag as XXX, may all be defined as relative position information of a nearest neighbor. Here, B is a node having a direct layer relationship with A, e.g., B is a parent, a child or a descendent node of A, etc. On the other hand, within a structure of a web page, nodes having style as ID or class are special types of nodes, and are nodes having special meanings. These nodes are key elements of the structure of the web page. Therefore, in the embodiment of the present disclosure, when defining relative position information of a nearest neighbor, nodes having a direct layer relationship with the target node and possessing style attributes such as ID or class are also defined as most adjacent nodes. Specifically, other key attributes that need to receive attention may also be defined based on actual needs. The present disclosure has no limitations thereon.

Figure 3:
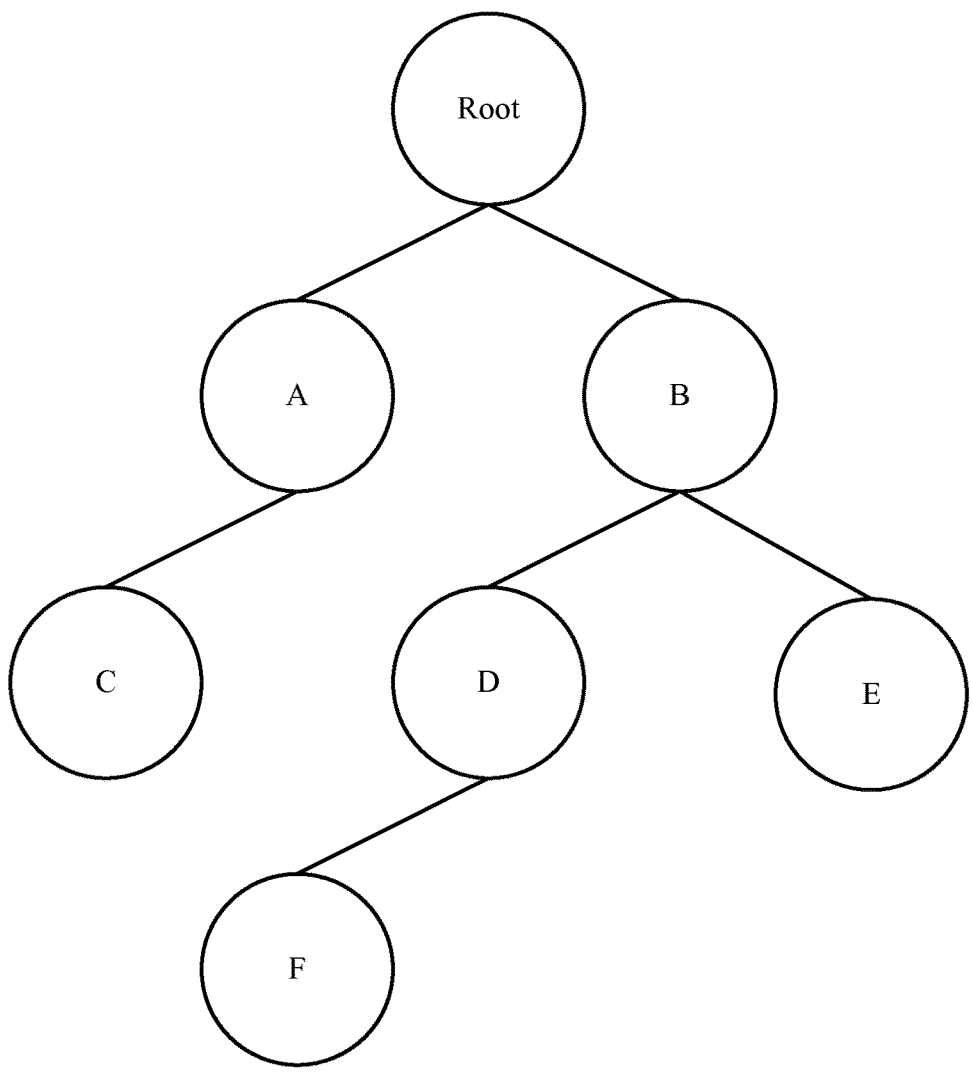
FIG. 3 is a schematic diagram illustrating a DOM structure in accordance with the first embodiment of the present disclosure.

FIG. 3 is a schematic diagram of a DOM structure in accordance with the first embodiment of the present disclosure. A connecting line in the figure only identifies a parent and child relationship, and nodes directly connected to a same parent are called sibling nodes. Text and style information of each node is represented in the following table.

TABLE 2

| Node | Tag Name | id  | class   | text   | src            |
|------|----------|-----|---------|--------|----------------|
| A    | head     |     |         |        |                |
| B    | body     |     |         |        |                |
| C    | title    |     |         |        |                |
| D    | div      | abc | div-top |        |                |
| E    | div      | 123 | div-top |        |                |
| F    | a        |     |         | google | www.google.com |

In FIG. 3, a node represented as "root" is the root node, where position information of nearest neighbors of node D can be described as:

(1) Information of nodes having a sibling, parent or child relationship with the target node
  D is a left sibling of E
  D is a child of B
  D is a first child of B
  F is a first child node of D (2) Position information of nodes having a direct layer relationship with the target node and possessing a text or style attribute
  D is a first child node of B with tag as div
  D is a first descendent node of B with style id as abc
  D is a first descendent node of the root with style as abc
  D is a first descendent node of B with class as div-top
  D is a first descendent node of the root with class as div-top
  F is a first child node of D with tag as a
  F is a first descendent node of D with text as "google"
  F is a first descendent node of D with src attribute as www.google.com By obtaining relative position information of nearest neighbors of each node, a path from the target node to the root node may be found based on the relative position information.

With A and B representing two nodes, and B being a node having a position most adjacent to A, the representation in Table 3 is an example of certain relative position information associated with a nearest neighbor.

TABLE 3

A is a left sibling of B
A is a right sibling of B
A is a parent of B (a first layer above)
A is a nth child node of B (a child is defined to be restricted to the first layer under a parent)
A is a nth node of a child of B with tag as XXX (generic)
A is a nth node among descendents of B (an entire node set of a forest under node B) with style id as XXX
A is a nth node among descendents of B with style class as XXX
A is a nth node among descendents of B with text as XXX
A is a nth node among descendents of B with value of style attribute x as y
B is a nth child node of A
B is a nth node of a child of A with tag as XXX
B is a nth node among descendents of A with style id as XXX
B is a nth node among descendents of A with style class as XXX
B is a nth node among descendents of A with text as XXX
B is a nth node among descendents of A with value of style attribute x as y When defining the relative position information that "A is a nth node among descendents of B with text as XXX", the text information of the associated node obtained at S203 is used.

When defining the relative position information that "B is a nth node among descendents of A with style id as XXX", the tag style ID information of the associated node obtained at S203 is used.

When defining the relative position information that "B is a nth node among descendents of A with style class as XXX", the tag style class information of the associated node obtained at S203 is used.

S205 uses previously obtained position information of the nodes, and starting from a target node, finds all the paths from the target node to a root node as a path set.

The node corresponding to the position of the information to be extracted in the DOM structure that is obtained at S202 is rendered as a target node. Starting from the target node, the previously obtained relative position information is traversed to obtain a node and determination is made as to whether the node is a root node. If not, another node is recursively found until a root node is found to form a candidate path. All candidate paths obtained from the target node to the root node form a path set.

Figure 4:
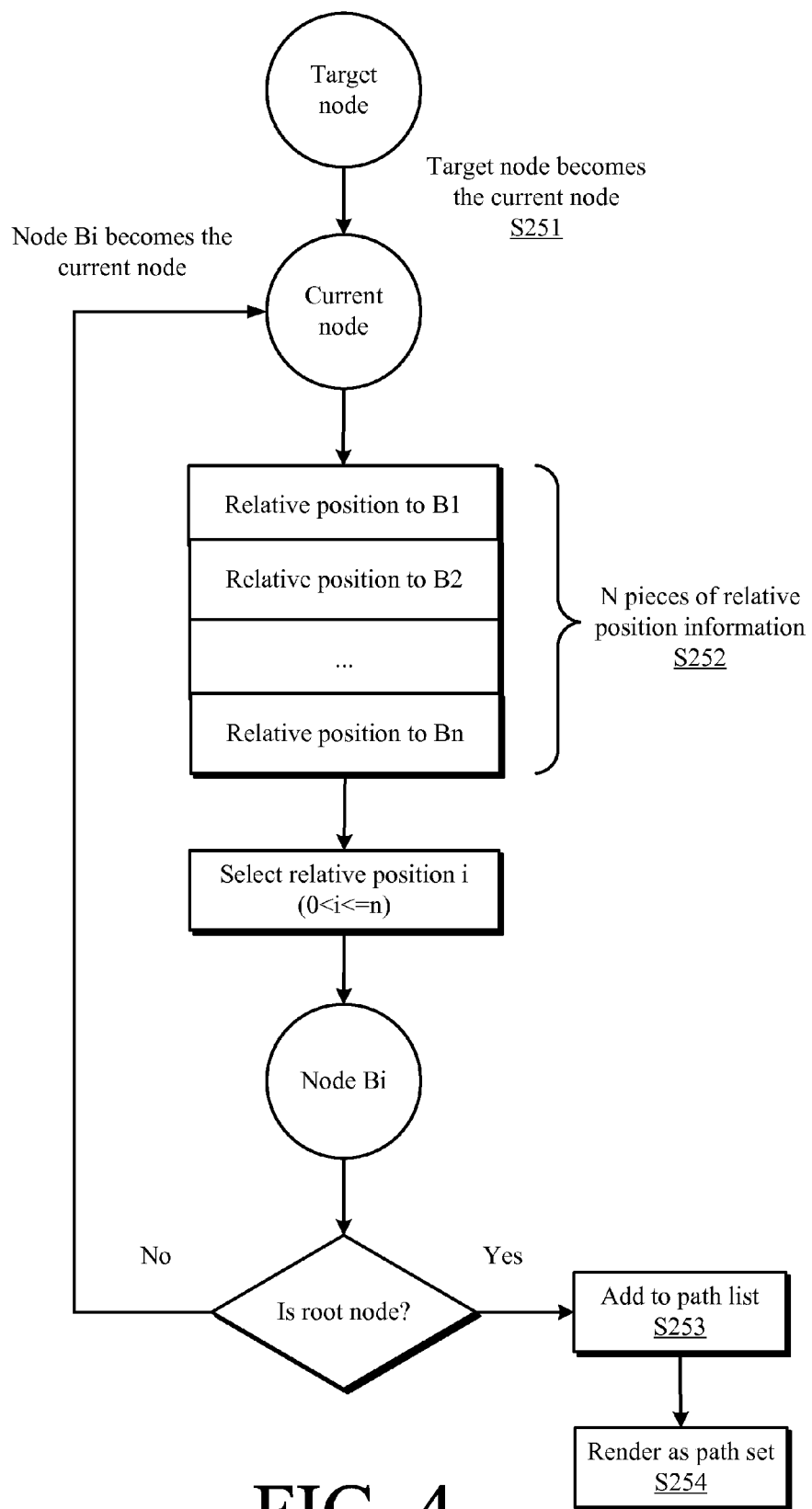
FIG. 4 is a chart illustrating path selection in accordance with the first embodiment of the present disclosure.

FIG. 4 is a chart of path selection in accordance with the first embodiment of the present disclosure. The details of the process are described below in conjunction with the figure.

S251, starting from the target node, sets the target node as a current node.

S252 traverses the previously obtained relative position information of nearest neighbors of the current node, and from which, selects a node Bi corresponding to a relative position i to determine whether Bi is the root node.

S253 adds an associated path into a path list if Bi is determined to be the root node, and if not, uses Bi as the current node, continues recursively to find another node until the root node is found, and adds a path thereof to the path list.

S254 renders paths in the path list as the path set.

An example path selection method of the present disclosure is described below in conjunction with FIG. 3 and relative position that has been defined previously.

In the embodiment of the present disclosure, we use relative position information of nearest neighbors of the nodes, start from the target node to find and render paths from the target node to the root node as the path set. In this case, the paths found from the target node to the root node are not only paths that go upwards layer by layer from the target node to the root node, but also hopping paths. As shown in FIG. 3, "root" node is the root node and the target node is D. Node B can be defined as a parent node of the target node D, node E is a right sibling of D, node F is a first child node of node D. Therefore, we may find at least four paths from the target node D to the root node:

(1) A path from the target node D to node B to the root node;

(2) A path from the target node D to node E to node B to the root node;

(3) A path from the target node D to node B to node A to the root node;

(4) If a piece of relative position information of D is described as "D is the first descendent node of root with style as abc", a direct path from the target node D to the root node can be found.

In the above paths, the first path can be viewed as a path that goes upwards layer by layer from the target node to the root node.

The second path uses the relative position information that "D is a left sibling of E" and "B is a parent of E" to find a path from the target node D to node E to node B to the root node.

The third path uses the relative position information that "D is the first child of B" and "A is a right sibling of B" to find a path from the target node D to node B to node A to the root node.

The fourth path uses the relative position information that "D is the first descendent node of root with style as abc" to find a direct path from the target node D to the root node. When finding the target node of the page to be extracted using the path set, this path may be used to obtain the target node from the root node.

The above paths in the path list are rendered as the path set. Among the above paths, only the first path is a path that goes upwards layer by layer from the target node to the root node. The other paths are paths using relative position information and hopping. If any changes occur to content or structure of a web page, the target node can still be located based on these multiple paths.

S206 analyzes a DOM structure of a page to be extracted.

Web pages to be extracted correspond to a set of pages having the same web page template of the sample page. In the embodiment provided by the present disclosure, the pages to be extracted may be obtained by using network crawler tools. Network crawlers (which are also called as web page spiders, network androids) are a process or script that automatically crawls information on the worldwide web according to certain criteria. Generally, a network crawler is an automatic web page extraction process which downloads pages from the worldwide web for a search engine, and is an important component of the search engine. When obtaining pages to be extracted, we may obtain the pages using the network crawler tools. A DOM tree for a page to be extracted is created to obtain a DOM structure of the entire page to be extracted.

S207 uses the paths that begin from the root node in the path set to locate position of the information to be extracted in the DOM structure of the page to be extracted, and obtains a node corresponding to the position of the information to be extracted in the DOM structure of the page to be extracted as an extracted node candidate set.

Figure 5:
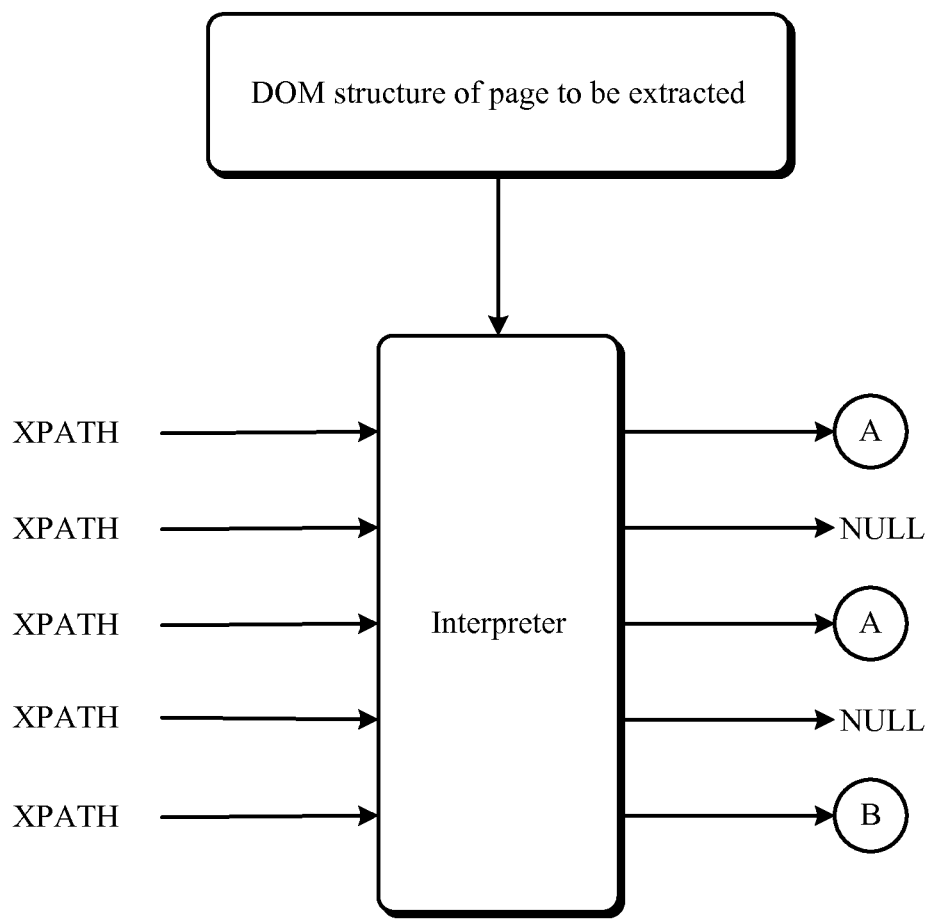
FIG. 5 is a schematic diagram illustrating an acquired candidate extracted node set in accordance with an embodiment of the present disclosure.

FIG. 5 is a schematic diagram of obtaining an extracted node candidate set of a page to be extracted using a path set in accordance with an embodiment of the present disclosure. As shown in FIG. 5, a path may locate a position of a pointing element in the DOM using an interpreter. As such, the path set obtained at S205 may be used to obtain an extracted node candidate set of the page to be extracted. The method used herein is to use multiple paths in the path set to locate content of the page to be extracted, i.e., starting from the root node to find the target node, which is the content to be extracted.

As subtle differences may exist in the page structure, the path may point to different nodes when locating elements in the page to be extracted, for example, A and B in FIG. 5. Invalid positioning may also occur because of the differences in the page structure, such as the invalid positioning as represented by NULL in the figure. For instance, when page content or page structure is updated, certain nodes in a path from the root node to the target node may be changed. If the method of automatically generating XPATH is used, i.e., using a path that goes upwards layer by layer from the root node to the target node, the content may not be able to be located. On the other hand, because we use relative position information to obtain multiple paths, multiple different nodes may be located when elements of the page to be extracted are located by the interpreter using a set of these paths.

S208 selects the most robust node from the extracted node candidate set as a final extracted node, and extract information using the extracted node.

In the embodiment of the present disclosure, when selecting a final extracted node, the most robust node is selected as the final extracted node. The most robust node corresponds to a node in the node set that is positioned most accurately and robustly. When choosing the most robust node, rules of reliability determination are used. Specifically, according to the rules of reliability determination, scores associated with paths corresponding to candidate extracted nodes in the extracted node candidate set are computed, and a node corresponding to a path with the highest score is chosen as the final extracted node. Selection of the most robust node is not limited to the example method provided in the present disclosure. Other computation methods may be used to select the most robust node.

Here, rules of reliability determination are used. The rules of reliability determination determine reliability of nodes having different relative position information, path lengths and shift position information based on differences in importance and stability. We define the rules of reliability determination as follows:

(1) Rules Associated Relative Position Information

A complete path is made up of a series of relative position information, and rules of reliability determination for each type of relative position information are different.

Table 4 shows a descending order of relative position information according to respective reliability:

TABLE 4

| Relative position information | Degree of reliability |
|---|---|
| style id, style class | High |
| text information, src attribute, href attribute, alt attribute | ↑ |
| title tag, img tag, h series tag, ul tag, form tag |   |
| other tags, other css attributes, parent relationship, |   |
| sibling relationship | ↓ |
| child relationship | Low |

Table 4 shows a descending order of relative position information according to respective reliability. We have two primary criteria for determining the reliability of relative position information: one is a degree of importance of a characteristic tag, and the other is its likelihood of change. Specifically, in a web page structure, nodes having markers of style id and style class are often special types of nodes and are very suitable for use during web page information extraction. Additionally, these types of nodes often do not change much when the web page structure is changed, and are stable and reliable nodes. Therefore, we can have their reliability listed at the top. A node having src attribute, href attribute or alt attribute often corresponds to a link. These types of nodes often possess uniqueness in the entire web page structure. Their corresponding content are often more important or significant, while likelihoods of change are relatively low. Therefore they are nodes receiving quite amount of attention when we perform path selection. Nodes with text information can often help us to directly find information of interest, e.g., a node with "price" information can help us quickly find information of interest when we extract information related to price. In the table, a parent node is more reliable than a child node because relationship from a target node to a parent node is one-to-one, whereas relationship from the target node to child node(s) may be many-to-one and therefore has a lower reliability.

(2) Rules Associated with a Total Number of Nodes

Reliability of a path is determined based on a total number of nodes passed in the path. The higher the number of nodes is passed, the longer the path is, the lower the reliability is, and the lower the robustness is. This is because the length of a path is longer as the total number of nodes increases. If information of any one of the nodes is changed, inaccurate positioning of the target node may occur. As the number of nodes increases, this type of risk increases, and therefore reliability decreases.

(3) Rules Associated with Shift Position Information

When describing position information of a node, we will express like this: A is a nth child node of B and A is a nth descendent node with style ID as ***. Here, a shift position refers to a shift number (such as an ordinal number) or a total number of shifts (how many in total) of position information. The greater the shift number is, the greater the total number of shifts is, the lower the reliability is. This is because the shift position reflects a degree of closeness of relation between nodes. A larger shift position indicates that the relationship between the nodes is less tight, and therefore the reliability is comparatively lower.

We use the above rules of reliability determination to determine reliability and robustness of paths, and select a node with the highest robustness as a final extracted node by determining reliability and robustness of the paths. Here, we provide scores for the paths according to the rules of reliability determination, and a path with a higher reliability is given a higher score. The above three types of reliability determination rules can be used separately or in combination. If determination is performed using a combination of three types of rules, a result thereof will be more accurate.

For example, let each path have a total score of one hundred and three paths be obtained in the extracted node candidate set obtained at step S208, where two paths pass through node A and one path passes through node B. If scores deducted for the paths that pass through node A are seventy and eighty respectively, a total score of node A is (100−70)+(100−80)=50. If a score deducted for the path through node B is ten, a total score of node B is 100−10=90. As such, an extraction result that has the highest score is the path pointing to node B. Therefore the node that is eventually extracted is B.

S209 compares a weight associated with a path corresponding to the final extracted node to a set threshold, and determines whether associated extraction is successful.

In the embodiment of the present disclosure, a result obtained after dividing "a total node score" of the final extracted node by "a total score of all paths" is compared to a set threshold to determine whether associated extraction has been successful. If the obtained result is greater than the set threshold, the extraction is determined to be failed. If the obtained result is less than or equal to the set threshold, the extraction is determined to be successful.

Second Embodiment

In a preferred embodiment of the present disclosure, when obtaining all the paths from a target node to a root node as a path set, the rules of reliability determination are used to find the first N paths from the target node to the root node that have the least score deductions as the path set. The higher the robustness is, the lower the score deduction is. In this way, the paths obtained are no longer all the paths from the target node to the root node, but are preferred paths in the path set that have the least score deductions.

Figure 6:
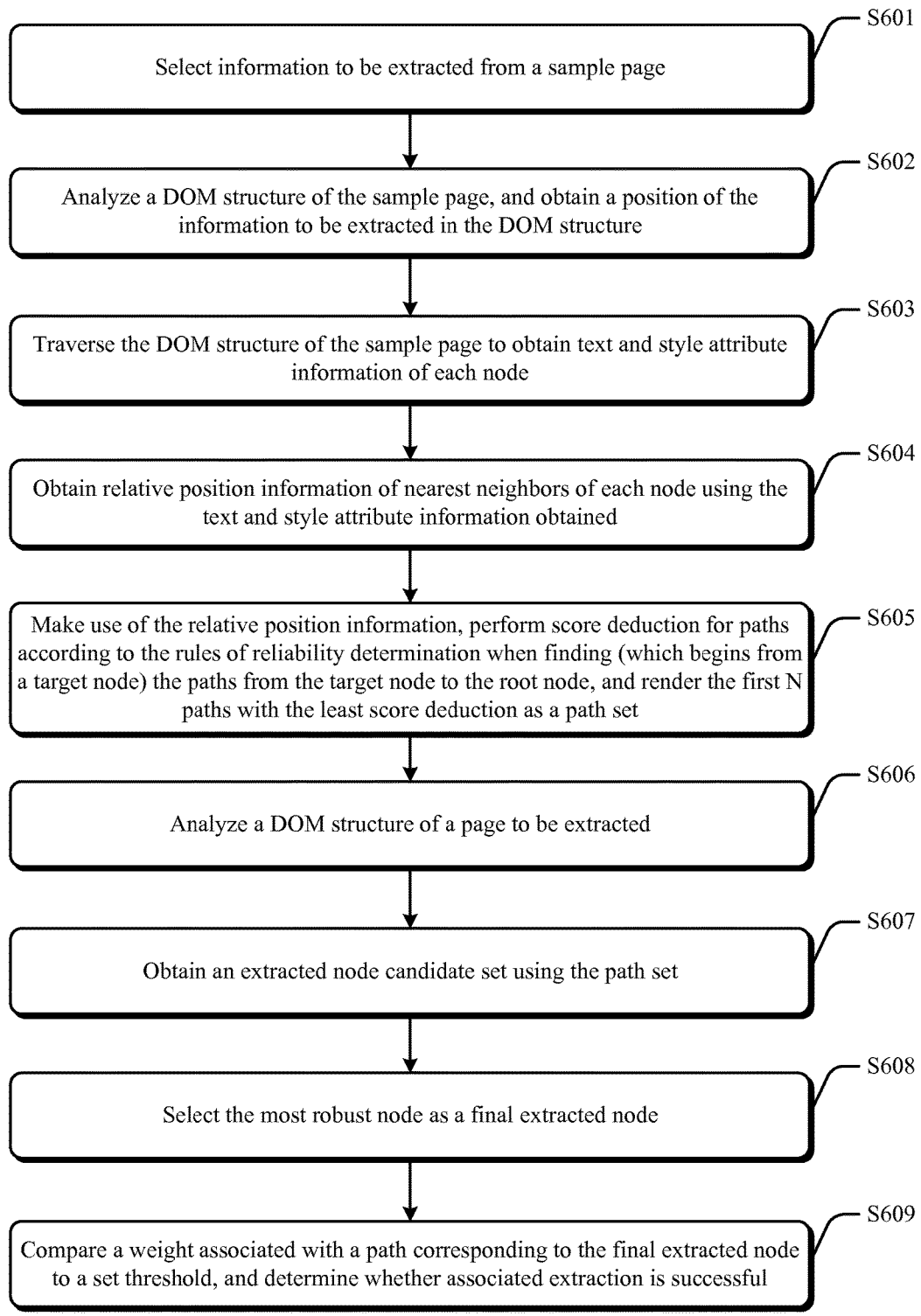
FIG. 6 is a schematic diagram illustrating a method in accordance with the second embodiment of the present disclosure.

The second embodiment of the present disclosure is described below in conjunction with the accompanying figure. FIG. 6 is a schematic diagram of the second example method.

S601 selects information to be extracted from a sample page.

S602 analyzes a DOM structure of the sample page, creates a DOM structure, and obtains a position of the information to be extracted in the DOM structure.

S603 traverses the DOM structure of the sample page to obtain text and style attribute information of each node.

S604 obtains relative position information of nearest neighbors of each node using the text and style attribute information obtained at S603.

S605 makes use of the relative position information, performs score deduction for paths according to the rules of reliability determination when finding (which begins from a target node) the paths from the target node to the root node, and renders the first N paths with the least score deduction as a path set.

A target node corresponds to a node that corresponds to the position of the information to be extracted in the DOM structure. A path is defined as a sequence of relative position information. A node is selected by traversing the position information obtained at S604. A total path score deduction is computed. If greater than a threshold, a propagation thereof is stopped. Otherwise, a next node is recursively found until the next node is as the root node.

Figure 7:
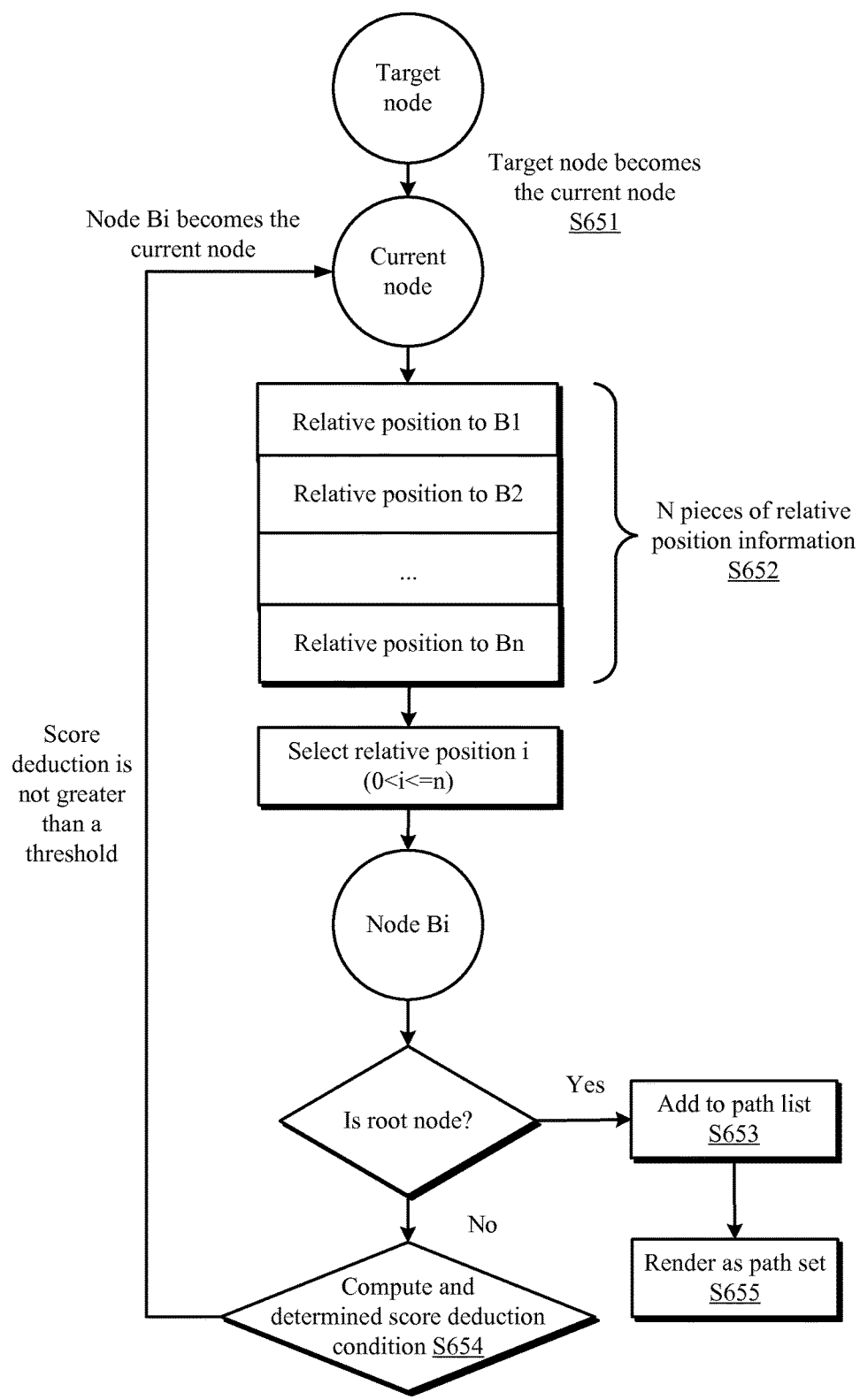
FIG. 7 is a chart illustrating path selection in accordance with the second embodiment of the present disclosure.

FIG. 7 is a chart illustrating path selection in accordance with the second embodiment of the present disclosure. The specific process is described below in conjunction with the accompanying figure.

S651, starting from the target node, sets the target node as a current node.

S652 traverses the previously obtained relative position information of nearest neighbors of the current node obtained at S604, and from which, selects a node Bi corresponding to a relative position i to determine whether Bi is the root node.

S653 adds an associated path into a path list if Bi is determined to be the root node, and if not, goes to S654.

S654 computes and determines a condition of score deduction in accordance with the rules of reliability determination, sets Bi node as the current node and goes to S652 if the score deduction is not greater than a threshold, and stops propagation if the score deduction is greater than the threshold.

S655 renders the first N paths with the least score deductions in the path list as a path set.

At S654, when computing and determining a condition of score deduction for a current path, the rules of reliability determination are designed as follows:

(1) Rules of Positional Information

A complete path is made up of a series of relative position information, and rules of reliability determination for each type of relative position information are different.

Table 5 shows a descending order of relative position information according to respective reliability:

TABLE 5

| Relative position information | Degree of reliability |
|---|---|
| style id, style class | High |
| text information, src attribute, href attribute, alt attribute | |
| title tag, img tag, h series tag, ul tag, form tag | |
| other tags, other css attributes, parent relationship, | |
| sibling relationship | ↓ |
| child relationship | Low |

Table 5 shows a descending order of relative position information according to respective reliability. As described in the first embodiment, we have two primary criteria for determining the reliability of relative position information: one is a degree of importance of a characteristic tag, and the other is its likelihood of change.

(2) Rules Associated with a Total Number of Nodes

Reliability of a path is determined based on a total number of nodes passed in the path. The higher the number of nodes is passed, i.e., the longer the path is, the lower the reliability is.

(3) Rules Associated with Shift Position Information

Determination is based on a shift position refers to a shift number (such as an ordinal number) or a total number of shifts (how many in total) of position information. The greater the shift number is, the greater the total number of shifts is, the lower the reliability is.

The above three types of reliability determination rules can be used separately or in combination. If determination is performed using a combination of three types of rules, a result thereof will be more accurate.

S606 analyzes a DOM structure of a page to be extracted, creates a DOM tree of the page to be extracted, and obtains the entire DOM structure of the page to be extracted.

S607 obtains an extracted node candidate set using the path set.

As shown in FIG. 5, paths can locate pointing elements in the DOM using an interpreter. In this way, the path set obtained at S605 can be used to obtain an extracted node candidate set of the page to be extracted. The method used herein is to use multiple paths in the path set to locate content of the page to be extracted, i.e., starting from the root node to find the target node, which is the content to be extracted.

As subtle differences may exist in the page structure, the path set may point to different nodes when locating elements in the page to be extracted.

S608 selects the most robust node from the extracted node candidate set as a final extracted node, and extract information using the extracted node.

S609 compares a weight associated with a path corresponding to the final extracted node to a set threshold, and determines whether associated extraction is successful.

In the embodiment of the present disclosure, a result obtained after dividing "a total node score" of the final extracted node by "a total score of all paths" is compared to a set threshold to determine whether associated extraction has been successful. If the obtained result is greater than the set threshold, the extraction is determined to be failed. If the obtained result is less than or equal to the set threshold, the extraction is determined to be successful.

Third Embodiment

In another preferred embodiment of the present disclosure, the rules of reliability determination are also used to find paths from a target node to a root node that have the least score deductions to form a path set. A main difference between the third embodiment and the second embodiment is that after finding all the paths from the target node to the root node, the third embodiment performs score deduction for all of the found paths according to the rules of reliability determination, and from which, selects the first N paths with the least deductions. On the other hand, In the second embodiment performs score deduction according to the rules of reliability determination during the propagation process, and stops the propagation if the score deduction greater than a threshold occurs.

Figure 8:
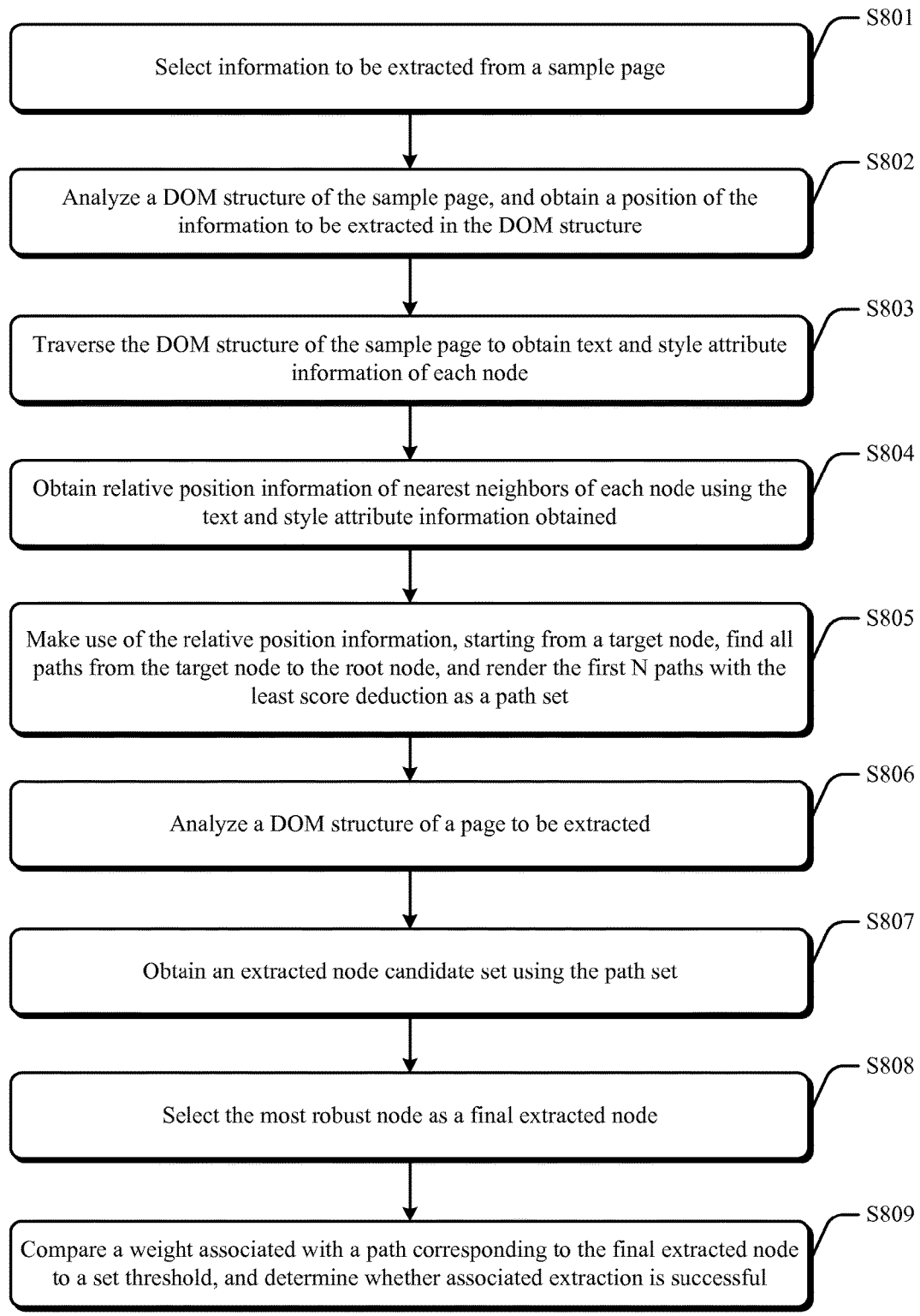
FIG. 8 is a schematic diagram illustrating a method in accordance with the third embodiment of the present disclosure.

FIG. 8 is a flowchart of a third example method of the present disclosure, which is described hereinafter in conjunction with the accompanying figure.

S801 selects information to be extracted from a sample page.

In the embodiment provided by the present disclosure, a user may select information to be extracted from a sample page through an interactive interface. At this time, the user can indicate the information to be extracted in the sample page using line selection or frame selection. If the information to be extracted in the sample page indicated by the user is "history and source", the user can select the information to be extracted using line or frame selection.

S802 analyzes the DOM structure of the sample page, builds up a DOM tree, obtains a position of the information to be extracted in the DOM structure, and obtains position information of a target node.

S803 traverses the DOM structure of the sample page to obtain information of text and style attributes associated with each node.

S804 obtains relative position information of nearest neighbors for each node using the text and style information obtained at S803.

S805, starting from a target node, finds all paths from the target node to a root node, performs score deduction for all the paths using rules of reliability determination, and finds the first N paths with the least score deductions.

Figure 9:
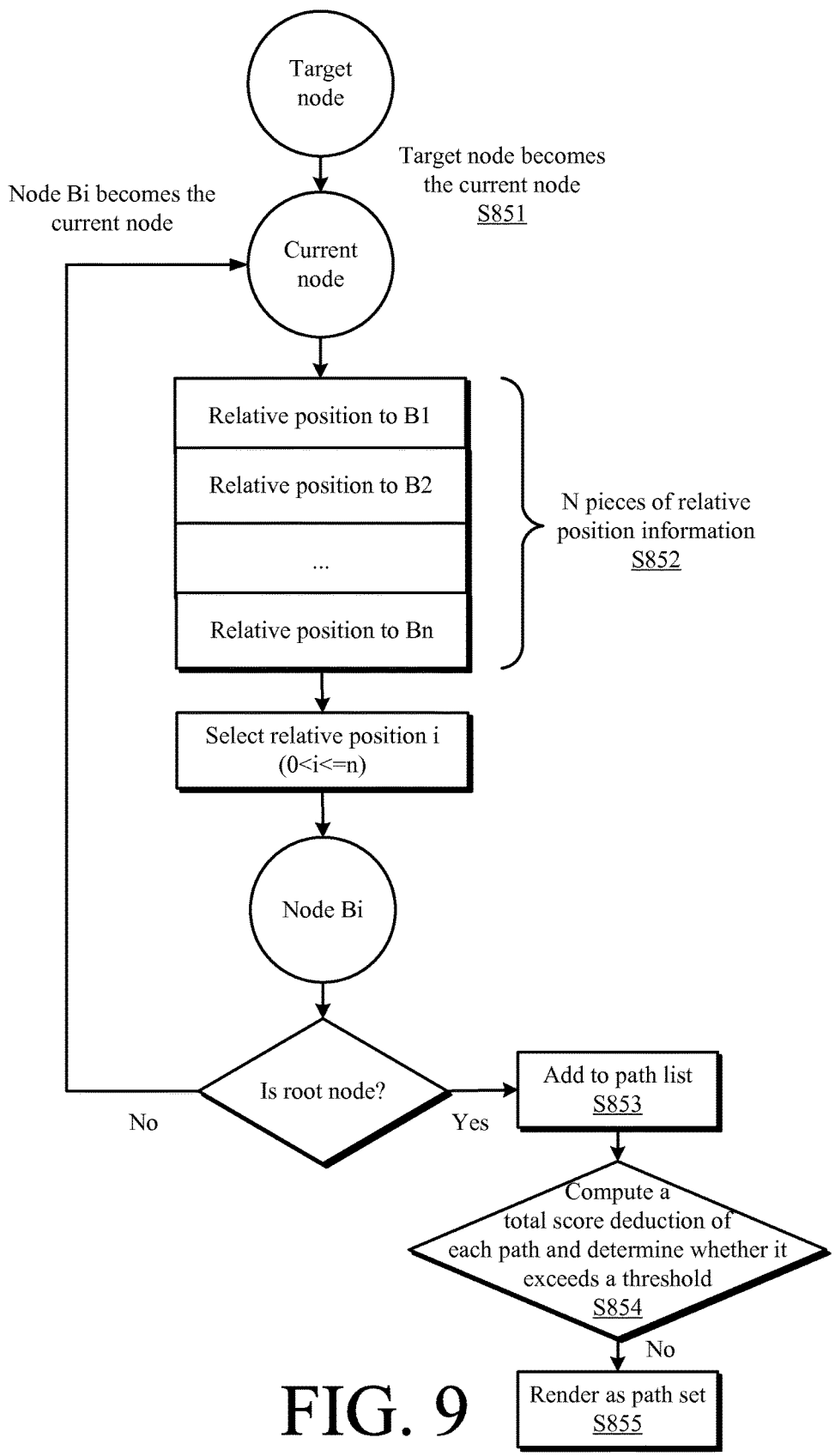
FIG. 9 is a chart illustrating path selection in accordance with the third embodiment of the present disclosure.

FIG. 9 is a chart of path selection in accordance with the third embodiment of the present disclosure. A specific process is described below in conjunction with the accompanying figure.

The specific process is as follows:

S851, starting from a target node, sets the target node as a current node.

S852 traverses the previously obtained relative position information of nearest neighbors of the current node obtained at S804, and from which, selects a node Bi corresponding to a relative position i to determine whether Bi is the root node.

S853 adds an associated path into a path list if Bi is determined to be the root node, and if not, sets Bi as the current node and goes to S852 until the root node is found.

S854 computes score deduction for all the found paths in accordance with the rules of reliability determination, determines whether a total path score deduction is greater than a threshold, retains a path result thereof if not greater than the threshold.

S855 renders the first N paths with the least score deductions in the path list as a path set.

S806 analyzes a DOM structure of a page to be extracted.

S807 obtains an extracted node candidate set using the path set.

As subtle differences may exist in the page structure, the path set may point to different nodes when locating elements in the page to be extracted.

S808 selects the most robust node from the extracted node candidate set as a final extracted node, and extract information using the extracted node.

S809 compares a weight associated with a path corresponding to the final extracted node to a set threshold, and determines whether associated extraction is successful.

In the embodiment of the present disclosure, a result obtained after dividing "a total node score" of the final extracted node by "a total score of all paths" is compared to a set threshold to determine whether associated extraction has been successful. If the obtained result is greater than the set threshold, the extraction is determined to be failed. If the obtained result is less than or equal to the set threshold, the extraction is determined to be successful.

In another embodiment of the present disclosure, the method further includes identifying a repeated structure. Extraction of page information may be categorized into: extraction of a single piece of information from a simple structure, extraction of multiple pieces of information from a repeated structure. Identifying a repeated structure allows extraction of information for multiple paths having the repeated structure.

An extraction method for a repeated structure includes:

computing path similarities between sibling nodes using path information of the nodes;

obtaining all sibling nodes having a repeated structure using the path similarities and recording shift information of the sibling nodes having the repeated structure;

filtering out equivalent paths owned by all the sibling nodes having the repeated structure as a path set for use during extraction.

The sibling nodes are defined as nodes that are directly connected to a same parent node. According to the embodiment of the present disclosure, if headers of two search results have the same structure in the DOM, we refer to this type of same (or substantially similar) DOM tree structure as a repeated structure.

As shown in the following tables, headers of two search results in Tables 6 and 7 are repeated content.

TABLE 6

Sister Jiang    Baidu Baike
Sister Jiang is a nickname of the famous revolutionary martyr Jiang Zhuyun, previously called as Jiang Zhiwei. Jiang Zhuyun was born on Aug. 20, 1920 in Zigong City, Sichuan . . .
Baike.baidu.com/view/59656.htm-web page screenshot - similar results

TABLE 7

Sister Jiang entire set -view online in high resolution - youku video channel
Sister Jiang, view Sister Jiang online, Sister Jiang entire set, TV drama about Sister Jiang . . .
www.youku.com/show_page/id_zaa64e69ada5a11de97c0.html- web page screenshot A DOM structure corresponding to the web page of Table 6 is shown in Table 8. A DOM structures corresponding to the web page of Table 7 is shown in Table 9.

TABLE 8

```
<li class="g">
  <div class="vsc"sig="GD-"rawurl=
"http://baike.baidu.com/view/59656.htm">
    <div class="vspi"></div>
    <span class="t1">
      <h8 class="r">
        <a class="1" onmousedown "return clk(this.href,
"","","","1",
"",'occAAFjAA')"href="http://baike.baidu.com/view/59656.htm">
        <em>Sister Jiang</em>
        Baidu Baike
      <a>
      </h3>
      <button class="vspib"></button>
    </span>
    <div class="s">
    </div>
</li>
```

TABLE 9

```
<li class="g">
  <div class="vsc"sig="6G1"rawurl="http://
www.youku.com/show_page/id_zaa64e69ada5a11de97c0.html">
    <div class="vspi"></div>
    <span class="t1">
      <h8 class="r">
        <a class="1" onmousedown "return clk(this.href,"","","","1",
"",'occ8QFjAB')"href="http://
www.youku.com/show page/id zaa64ada5a11de97c0.html">
        <em>Sister Jiang</em>
        entire set- view online in high resolution -Youku video channel
      <a>
      </h3>
      <button class="vspib"></button>
    </span>
    <div class="s">
    </div>
</li>
```

As shown in Tables 8 and 9, the portions in bold italics are headers in a repeated structure.

Determination of equivalent paths: if two paths only differ in shifts, the two paths are considered to be equivalent.

For example:

Paths associated with the first header:

A a parent of the first "em" element of the first "li" element

B the first "a" element of the first "li" element

C the first "a" element having class as "l" element of the first "li" element

Paths associated with the second header:

A' a parent of the first "em" element of the second "li" element

B' the first "a" element of the second "li" element

C' the first "a" element having class as "l" element of the second "li" element

Corresponding three pairs of paths are determined to be equivalent, i.e., A and A', B and B' and C and C' are determined to be equivalent respectively because they only differ in shifts.

When determining a repeated structure and computing a degree of similarity between nodes, we use the following computation method.

A computation method of sim(A, B):

$$sim(A, B) = \frac{\sum_{x}^{path(A \cap B)} score(x)}{\sum_{x}^{path(A \cup B)} score(x)}$$

where sim(A, B) represents a degree of similarity between nodes A and B;

path(A∩B) represents a set of equivalent paths associated with the nodes A and B;

path(A∪B) represents a set including all the paths associated with the nodes A and B; and score(x) represents a score deduction of a path x.

Therefore, based on the threshold and the established scoring function, repeated sibling nodes of node A can be located. Then, all repeated sibling nodes having equivalent paths can be filtered out as the path that is used during extraction. Shift information of the repeated siblings can be recorded and used for extracting multiple pieces of data from the repeated structure.

Correspondingly, when extracting a page to be extracted using a XPATH set, if a path points to a repeated structure, steps are taken to record shift information of repeated siblings and extract multiple pieces of data. As previously mentioned, extraction of page information may be categorized as: extraction of a single piece of information from a simple structure; extraction of multiple pieces of information from a repeated structure. If a path points to a repeated structure, since we have previously recorded the shift information of the repeated siblings, we can use the shift information of the repeated siblings to extract multiple pieces of data having a repeated structure when the repeated structure is extracted.

From the above descriptions of the exemplary embodiments, one skilled in the art can clearly understand that the disclosed method and system may be implemented using software with essential universal hardware platform, or using hardware, with the former implementation approach being preferable in many situations. Based on this understanding, the technical scheme of the present disclosure or contributions to existing technology may be implemented in the form of software products. The software products may be stored in a non-volatile storage media, e.g., ROM/RAM, disk, or compact disc, etc., and includes instructions for a computing device (e.g., a personal computer, a server or a networked device, etc.) to execute the method described in the exemplary embodiments or certain parts of the exemplary embodiments in the present disclosure. These storage media includes: media capable of storing programming codes such as read-only memory (ROM), random access memory (RAM), magnetic disk or optical disk, etc.

Corresponding to the above exemplary methods, the present disclosure further provides a system of extracting web page information.

Figure 10:
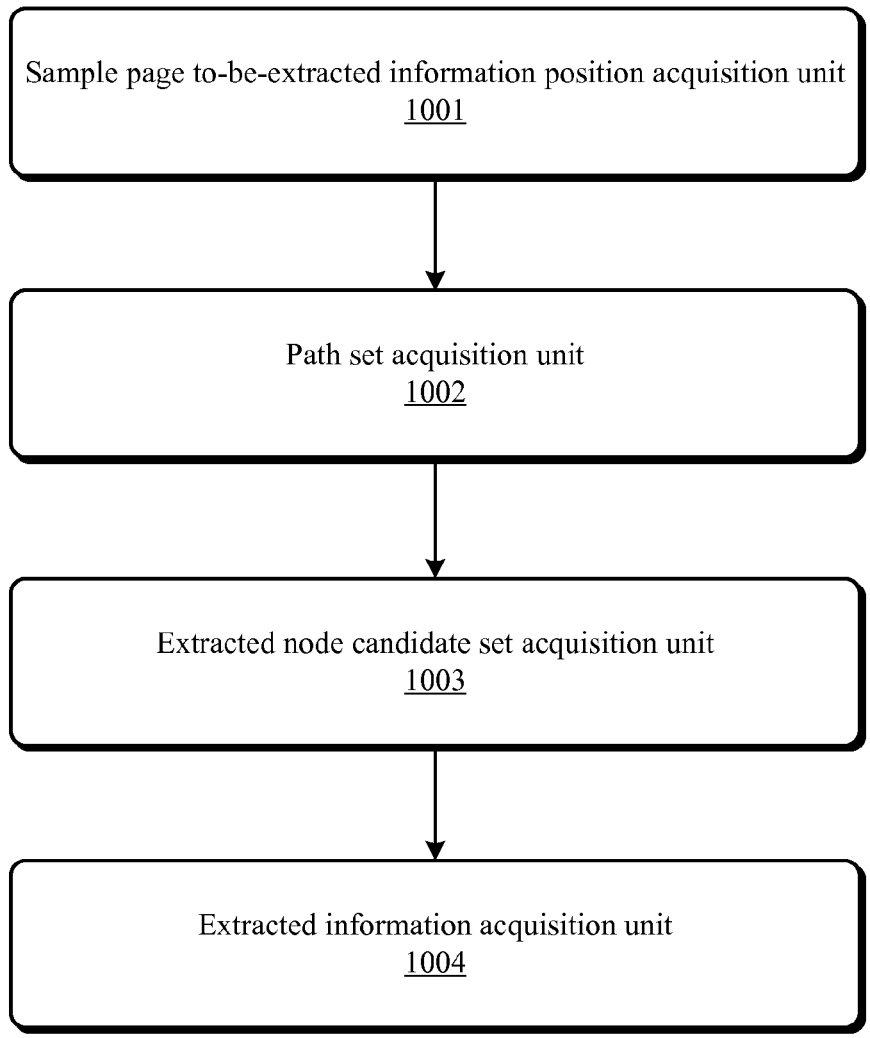
FIG. 10 is a schematic diagram illustrating a system in accordance with an embodiment of the present application's method.

FIG. 10 is a schematic diagram of an exemplary system, which is described below in conjunction with the accompanying figure.

A sample page to-be-extracted information position acquisition unit 1001 is used for analyzing a DOM structure of a sample page and obtaining position of information to be extracted in the DOM structure.

A path set acquisition unit 1002 is used for rendering a node corresponding to the position of the information to be extracted in the DOM structure as a target node, starting from the target node, traversing relative position information that has been obtained in advance to obtain a node and determine whether the node is a root node, if not, continuing recursively to find another node until the root node is found to create candidate paths, and rendering the candidate paths obtained from the target node to the root node as a path set.

An extracted node candidate set acquisition unit 1003 is used for analyzing a DOM structure of a page to be extracted, locating the information to be extracted in the DOM structure of the page to be extracted using a path starting from the root node in the path set, and obtaining a node corresponding to the position of the information to be extracted in the DOM structure of the page to be extracted as an extracted node candidate set.

An extracted information acquisition unit 1004 is used for selecting a node having the highest robustness from the extracted node candidate set to be a final extracted node and obtaining extracted information using the extracted node.

A node position information acquisition sub-unit is used for traversing the DOM structure to obtain text and style information of nodes, and obtaining relative position information of nearest neighbors for each node using the text and style information.

The system further includes:

a repeated structure recognition unit used for computing path similarities between the nodes using path information of the nodes in the obtained path set and identifying a path having a repeated structure.

The repeated structure recognition unit includes:

a path similarity computation sub-unit used for computing the path similarities between sibling nodes using the path information of the nodes;

a repeated sibling node acquisition sub-unit obtaining all sibling nodes having the repeated structure using the path similarities;

a shift information recording sub-unit used for recording shift information of sibling nodes having the repeated structure; and an equivalent path acquisition sub-unit used for filtering out equivalent paths owned by all the sibling nodes having the repeated structure as the path set used during extraction.

The system further includes:

an extraction result determination unit that compares a weight of the path corresponding to the final extracted node relative to the path set against a set threshold to determine whether associated extraction is successful.

Figure 11:
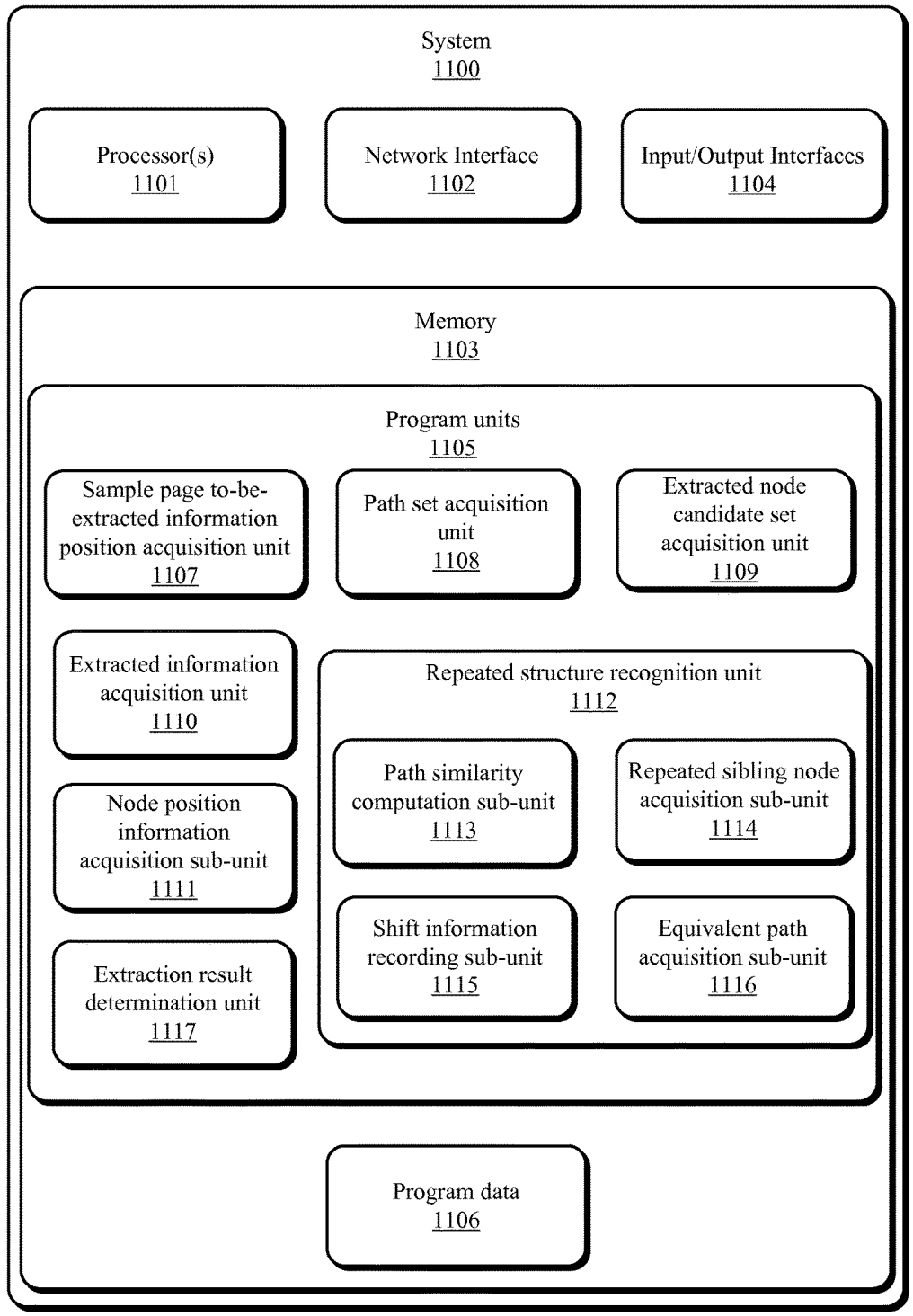
FIG. 11 is the exemplary system described in FIG. 10 in more detail.

FIG. 11 illustrates an exemplary system 1100, such as the system as described above, in more detail. In one embodiment, the system 1100 can include, but is not limited to, one or more processors 1101, a network interface 1102, memory 1103, and an input/output interface 1104.

The memory 1103 may include computer-readable media in the form of volatile memory, such as random-access memory (RAM) and/or non-volatile memory, such as read only memory (ROM) or flash RAM. The memory 1103 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 1103 may include program units 1105 and program data 1106. In one embodiment, the program units 1105 may include a sample page to-be-extracted information position acquisition unit 1107, a path set acquisition unit 1108, an extracted node candidate set acquisition unit 1109 and an extracted information acquisition unit 1110. In one embodiment, the program unit 1105 may further include a node position information acquisition sub-unit 1111, a repeated structure recognition unit 1112, a path similarity computation sub-unit 1113, a repeated sibling node acquisition sub-unit 1114, a shift information recording sub-unit 1115, an equivalent path acquisition sub-unit 1116 and an extraction result determination unit 1117. Details about these program units and any sub-units and/or modules may be found in the foregoing embodiments.

In the technical proposal provided by the present disclosure, when a path set of a sample page is obtained, a reverse positioning method is used to obtain multiple non-strictly ordered paths from a target node to a root node by analyzing a DOM structure and text content. A multiple path positioning method is then used to locate information of a page to be extracted based on a path set formed by the multiple paths. Therefore, as multiple paths are obtained to locate information of the page to be extracted, content to be extracted can be accurately be located with good robustness even if the page information has been modified and the structure has been changed, provided that the page has not been restructured substantially.

Moreover, by using the rules of reliability determination, the disclosed method and system obtain a large number of weighted and not strictly ordered paths, extract content by locating multiple paths, and select a final extraction result based on associated weights of the paths. As the large number of paths includes abundant page information, an accurate positioning result is obtained under a premise of preserving data accuracy without increasing interaction cost. Therefore, the problems of extraction failures or inaccurate extraction results due to invalid position information after content of a web page is updated and structure of the web page structure is changed are solved.

Furthermore, based on the abundant information associated with the multiple paths and computation of overall degrees of similarity of the paths, the technical scheme provided in the present disclosure can complete determination of a repeated structure, thus solving the problem of identifying and extracting repeated structures.

The foregoing descriptions are merely specific embodiments of the present disclosure. It should be noted that, for a person of ordinary skill in the art, the present disclosure can be altered or modified in many ways without departing from the principles of the present disclosure. These modifications and improvements should also be covered within the protection scope of the present disclosure.

The invention claimed is:

1. A method implemented by one or more computing devices, the method comprising:
    obtaining a position of information to be extracted from a first document object model (DOM) structure of a sample page;
    rendering a first node corresponding to the position of the information to be extracted in the first DOM structure of the sample page as a target node;
    determining multiple candidate paths from the target node to a root node by recursively traversing, starting from the target node, relative position information of the first DOM structure of the sample page to find one or more additional nodes until the root node is found;
    rendering the multiple candidate paths as a path set;
    locating, based at least in part on the path set, information to be extracted from a second DOM structure of a web page;
    determining a node candidate set based at least in part on the locating the information to be extracted from the second DOM structure of the web page;
    selecting a second node from the node candidate set; and
    obtaining information from the second DOM structure of the web page using the second node.

2. The method as recited in claim 1, wherein the recursively traversing, starting from the target node, relative position information of the first DOM structure of the sample page to find one or more additional nodes until the root node is found comprises:
    rendering the target node as a current node;
    traversing relative position information of nearest neighbor nodes of the current node, the relative position information having been obtained in advance;
    selecting, from the relative position information, a Bi node corresponding to a relative position i, and determining whether the Bi node is the root node;
    responsive to determining that the Bi node is the root node, adding a path from the target node to the Bi node to a path list;
    responsive to determining that the Bi node is not the root node, using the Bi node as the current node and recursively finding another node until the root node is found and adding a path thereof to the path list; and
    rendering paths in the path list as the path set.

3. The method as recited in claim 1, wherein the selecting the second node from the node candidate set comprises:
    computing, based on rules of reliability determination, scores associated with paths corresponding to one or more nodes of the node candidate set; and
    determining that the second node corresponds to a path having a highest score among the paths.

4. The method as recited in claim 1, wherein the recursively traversing, starting from the target node, relative position information of the first DOM structure of the sample page to find one or more additional nodes until the root node is found comprises:
    rendering the target node as a current node;
    traversing relative position information of nearest neighbor nodes of the current node, the relative position information having been obtained in advance;
    selecting, from the relative position information, a Bi node corresponding to a relative position i, and determining whether the Bi node is the root node;

responsive to determining that the Bi node is the root node, adding a path from the target node to the Bi node to a path list;
responsive to determining that the Bi node is not the root node:
determining a condition of a score deduction according to rules of reliability determination;
if the score deduction is not greater than a set threshold, using the Bi node as the current node, and continuing the recursively traversing to find another node until the root node is found and adding a path thereof to the path list; and
if the score deduction is greater than the threshold, stopping the recursively traversing to perform a search on a current path; and
storing first N paths having the least score deductions in the path list as the path set.

5. The method as recited in claim 1, wherein the recursively traversing, starting from the target node, relative position information of the first DOM structure of the sample page to find one or more additional nodes until the root node is found comprises:
rendering the target node as a current node;
traversing relative position information of nearest neighbors of the current node, the relative position information having been obtained in advance;
selecting, from the relative position information, a Bi node corresponding to a relative position i, and determining whether the Bi node is the root node;
responsive to determining that the Bi node is the root node, adding a path from the target node to the Bi node to a path list;
responsive to determining that the Bi node is not the root node, using the Bi node as the current node and continuing the recursively traversing to find another node until the root node is found and adding a path thereof to the path list;
according to rules of reliability determination, performing score deductions for all paths found in the path list;
responsive to determining that a total score deduction of an individual path is not greater than a threshold, retaining a result associated with the individual path; and
storing first N paths having lowest score deductions in the path list as the path set.

6. The method as recited in claim 5, wherein N is a predetermined integer.

7. The method as recited in claim 5, wherein the selecting the second node from the node candidate set comprises selecting a node corresponding to a path having a highest score among one or more paths of the path set.

8. The method as recited in claim 5, wherein the rules of reliability determination comprise rules associated with at least one of the relative position information, a total number of nodes, or shift position information.

9. The method as recited claim 1, further comprising obtaining the relative position information of the first DOM structure of the sample page, wherein the obtaining the relative position information includes:
traversing the first DOM structure of the sample page to obtain text and style information of nodes; and
obtaining relative position information of nearest neighbors for each node of the nodes using the text and style information.

10. The method as recited in claim 1, further comprising computing path similarities between sibling nodes in the path set based on path information of the sibling nodes.

11. The method as recited in claim 10, further comprising:
obtaining, based on the path similarities, sibling nodes having a repeated structure; and
recording shift information of the sibling nodes having the repeated structure;
wherein the determining the multiple candidate paths includes filtering out, as the multiple candidate paths, equivalent paths associated with the sibling nodes having the repeated structure.

12. The method as recited in claim 11, further comprising extracting, from the first DOM structure of the sample page, multiple paths that have the repeated structure using the shift information of the sibling nodes that have the repeated structure, wherein the node candidate set is determined based at least in part on the extracted multiple paths.

13. The method as recited in claim 11, wherein the computing the path similarities between the sibling nodes based on the path information of the sibling nodes comprises:

$$sim(A, B) = \frac{\sum_{x}^{path(A \cap B)} score(x)}{\sum_{x}^{path(A \cup B)} score(x)}$$

where sim(A, B) represents a degree of similarity between nodes A and B;
path(A∩B) represents a set of equivalent paths associated with the nodes A and B;
path(A∪B) represents a set including all paths associated with the nodes A and B; and
score(x) represents a score deduction of a path x.

14. The method as recited in claim 1, further comprising:
comparing a weight of a path corresponding to the second node against a set threshold;
responsive to determining that the weight satisfies the set threshold, determining that an extraction result associated with the second node failed; and
responsive to determining that the weight does not satisfy the set threshold, determining that the extraction result associated with the second node was successful.

15. A system comprising:
memory;
one or more processors;
a sample page to-be-extracted information position acquisition unit stored in the memory and executable by the one or more processors to obtain a position of information to be extracted from a first document object model (DOM) structure of a sample page;
a path set acquisition unit stored in the memory and executable by the one or more processors to:
render a first node corresponding to the position of the information to be extracted in the first DOM structure of the sample page as a target node;
determine multiple candidate paths from the target node to a root node by recursively traversing, starting from the target node, relative position information of the first DOM structure of the sample page to find one or more additional nodes until the root node is found; and
render the multiple candidate paths as a path set;
a node candidate set acquisition unit stored in the memory and executable by the one or more processors to:

locate, based at least in part on the path set, information to be extracted from a second DOM structure of a web page; and determine a node candidate set based at least in part on the locating the information to be extracted from the second DOM structure of the web page; and an extracted information acquisition unit stored in the memory and executable by the one or more processors to:

select a second node from the node candidate set; and obtain information from the second DOM structure of the web page using the second node.

16. The system as recited in claim 15, further comprising a node position information acquisition sub-unit stored in the memory and executable by the one or more processors to:

traverse the first DOM structure of the sample web page to obtain text and style information of nodes; and obtain relative position information of nearest neighbors for each node of the nodes using the text and style information.

17. The system as recited in claim 15, further comprising a repeated structure recognition unit stored in the memory and executable by the one or more processors to compute path similarities between sibling nodes in the path set based on path information of the sibling nodes in the obtained path set.

18. The system as recited in claim 17, wherein the repeated structure recognition unit comprises:

a repeated sibling node acquisition sub-unit used for obtaining, based on the path similarities, sibling nodes having a repeated structure;

a shift information recording sub-unit used for recording shift information of the sibling nodes having the repeated structure; and an equivalent path acquisition sub-unit used for filtering out equivalent paths associated with the sibling nodes having the repeated structure;

wherein the determining the multiple candidate paths includes selecting the filtered out equivalent paths as the multiple candidate paths that are to be rendered as the path set.

19. The system as recited in claim 15, further comprising an extraction result determination unit stored in the memory and executable by the one or more processors to:

compare a weight of a path corresponding to the second node against a set threshold;

responsive to determining that the weight satisfies the set threshold, determine that an extraction result associated with the second node failed; and responsive to determining that the weight does not satisfy the set threshold, determine that the extraction result associated with the second node was successful.

20. One or more computer-readable media storing executable instructions that, when executed by one or more processors, configure the one or more processors to perform acts comprising:

obtaining a position of information to be extracted from a first document object model (DOM) structure of a sample page;

rendering a first node corresponding to the position of the information to be extracted in the first DOM structure of the sample page as a target node;

determining multiple candidate paths from the target node to a root node by recursively traversing, starting from the target node, relative position information of the first DOM structure of the sample page to find one or more additional nodes until the root node is found;

rendering the multiple candidate paths as a path set;

locating, based at least in part on the path set, information to be extracted from a second DOM structure of a web page;

determining a node candidate set based at least in part on the locating the information to be extracted from the second DOM structure of the web page;

selecting a second node from the node candidate set; and obtaining information from the second DOM structure of the web page using the second node.

* * * * *